United States Patent
Adler et al.

(10) Patent No.: US 12,307,668 B2
(45) Date of Patent: May 20, 2025

(54) METHODS AND SYSTEMS FOR DEFECTS DETECTION AND CLASSIFICATION USING X-RAYS

(71) Applicant: Bruker Nano, Inc., Santa Barbara, CA (US)

(72) Inventors: David Lewis Adler, San Jose, CA (US); Freddie Erich Babian, Palo Alto, CA (US)

(73) Assignee: Bruker Nano, Inc, Santa Barbara, CA (US)

( * ) Notice: Subject to any disclaimer, the term of this patent is extended or adjusted under 35 U.S.C. 154(b) by 891 days.

(21) Appl. No.: 16/924,645

(22) Filed: Jul. 9, 2020

(65) Prior Publication Data

US 2021/0010953 A1 Jan. 14, 2021

Related U.S. Application Data

(60) Provisional application No. 62/873,752, filed on Jul. 12, 2019.

(51) Int. Cl.
 *G06T 7/00* (2017.01)
 *G01N 23/04* (2018.01)
 (Continued)

(52) U.S. Cl.
 CPC ........... *G06T 7/0014* (2013.01); *G01N 23/04* (2013.01); *G01N 23/043* (2013.01);
 (Continued)

(58) Field of Classification Search
 CPC ..... G06T 7/0014; G06T 5/007; G06T 7/0012; G06T 2207/10081; G06T 2207/10116;
 (Continued)

(56) References Cited

U.S. PATENT DOCUMENTS

| 2003/0118149 A1 | 6/2003 | Okuda |
| 2017/0200524 A1* | 7/2017 | Adler ............... G01N 23/04 |

(Continued)

FOREIGN PATENT DOCUMENTS

| CN | 109001230 A | 12/2018 |
| CN | 109668909 A | 4/2019 |
| TW | 201915941 A | 4/2019 |

OTHER PUBLICATIONS

Jürgen Giersch, Daniel Niederlohner, Gisela Anton, The influence of energy weighting on X-ray imaging quality, Nuclear Instruments and Methods in Physics Research Section A: Accelerators, Spectrometers, Detectors and Associated Equipment, vol. 531, Issues 1-2, 2004, pp. 68-74, ISSN 0168-9002 (Year: 2004).*

(Continued)

*Primary Examiner* — Son T Le
*Assistant Examiner* — Brian Butler Geiss
(74) *Attorney, Agent, or Firm* — Boyle Frederickson S.C

(57) ABSTRACT

In one embodiment, an automated high-speed X-ray inspection system may identify reference objects for an object of interest to be inspected. Each reference object may have a same type and components as the object of interest. The system may generate a reference model for the object of interest based on X-ray images of the reference objects. The system may determine whether the object of interest is associated with one or more defects by comparing an X-ray image of the object of interest to the reference model. The defects may be characterized by one or more pre-determined defect models and may be classified into respective defect categories based on the pre-determined defect models.

21 Claims, 10 Drawing Sheets

(51) Int. Cl.
    *G01N 23/083*     (2018.01)
    *G01N 23/18*     (2018.01)
    *G01T 1/20*     (2006.01)
    *G06F 18/214*     (2023.01)
    *G06F 18/24*     (2023.01)
    *G06F 30/398*     (2020.01)
    *G06F 115/12*     (2020.01)
    *G06F 119/18*     (2020.01)
    *G06N 20/00*     (2019.01)
    *G06T 5/90*     (2024.01)
    *H01L 21/67*     (2006.01)
    *H05K 1/11*     (2006.01)
    *H05K 3/40*     (2006.01)

(52) U.S. Cl.
    CPC ........... *G01N 23/083* (2013.01); *G01N 23/18* (2013.01); *G01T 1/20* (2013.01); *G06F 18/214* (2023.01); *G06F 18/24* (2023.01); *G06F 30/398* (2020.01); *G06N 20/00* (2019.01); *G06T 5/90* (2024.01); *G06T 7/0012* (2013.01); *H01L 21/67288* (2013.01); *H05K 1/115* (2013.01); *H05K 3/4038* (2013.01); *G01N 2223/04* (2013.01); *G01N 2223/401* (2013.01); *G01N 2223/426* (2013.01); *G01N 2223/505* (2013.01); *G01N 2223/6466* (2013.01); *G06F 2115/12* (2020.01); *G06F 2119/18* (2020.01); *G06T 2207/10081* (2013.01); *G06T 2207/10116* (2013.01); *G06T 2207/20024* (2013.01); *G06T 2207/20081* (2013.01); *G06T 2207/20208* (2013.01); *G06T 2207/30004* (2013.01)

(58) Field of Classification Search
CPC . G06T 2207/20024; G06T 2207/20081; G06T 2207/20208; G06T 2207/30004; G06N 20/00; G06F 30/398; G06F 18/24; G06F 18/214; G06F 2119/18; G06F 2115/12; G01N 23/04; G01N 23/043; G01N 23/083; G01N 23/18; G01N 2223/04; G01N 2223/401; G01N 2223/426; G01N 2223/505; G01N 2223/6466; G01T 1/20; H01L 21/67288; H05K 1/115; H05K 3/4038

See application file for complete search history.

(56) References Cited

U.S. PATENT DOCUMENTS

| | | | |
|---|---|---|---|
| 2018/0293721 A1 | 10/2018 | Gupta | |
| 2018/0300865 A1* | 10/2018 | Weiss | G06T 7/001 |
| 2018/0322635 A1* | 11/2018 | Guo | G06T 7/12 |
| 2018/0342051 A1 | 11/2018 | Sezginer | |
| 2019/0212281 A1 | 7/2019 | Shchegrov | |
| 2019/0370955 A1* | 12/2019 | Zhang | G06T 7/0004 |

OTHER PUBLICATIONS

International Search Report and Written Opinion for International Application No. PCT/US2020/041514, Oct. 20, 2020.

* cited by examiner

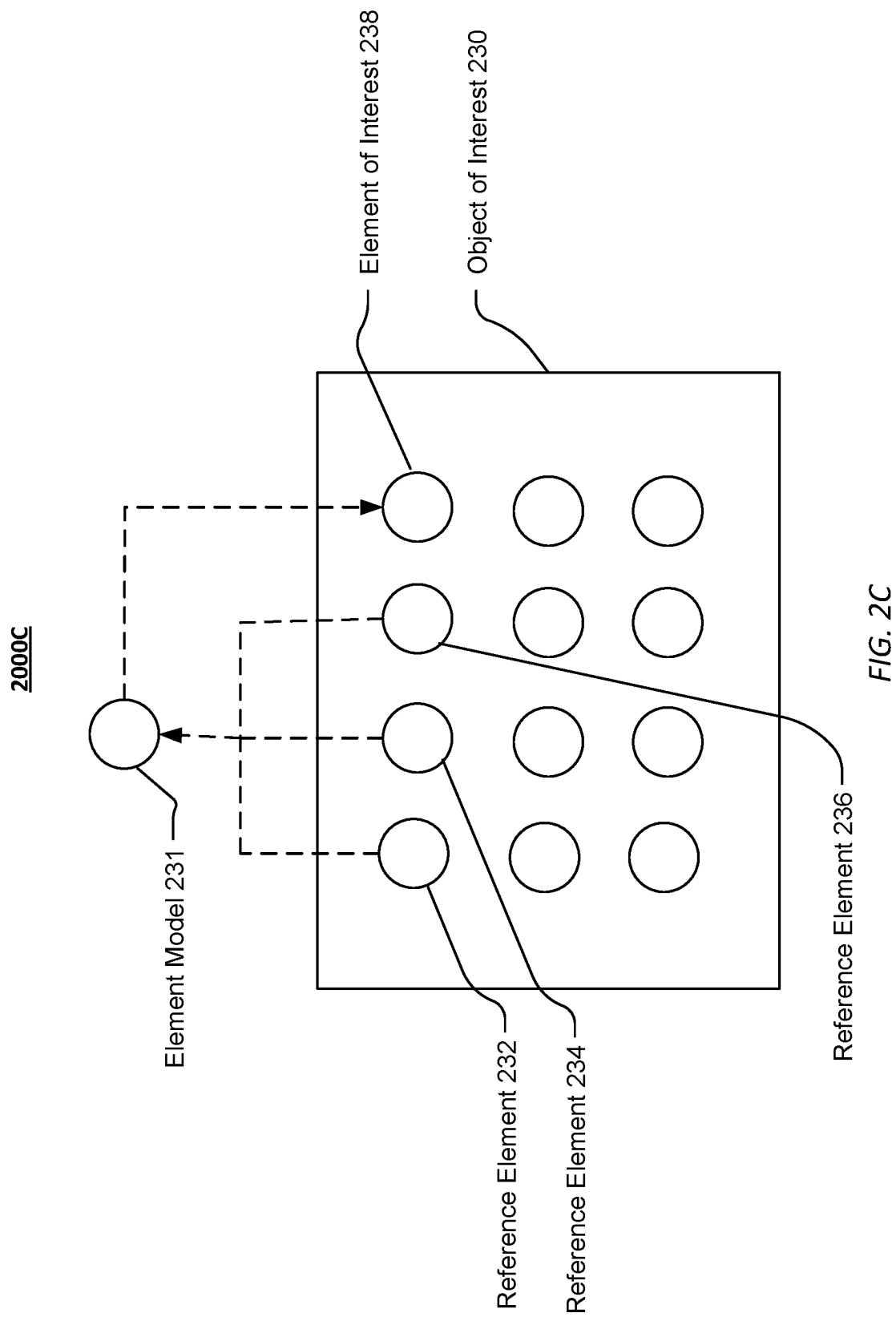

4000

Extract a first set of features from one or more regions of interest in an X-ray image, wherein the one or more regions of interest are associated with an element of interest of the inspected sample
410

↓

Classify the inspected sample into an inlier category or an outlier category based on the extracted first set of features and known first set of features associated with a number of inlier samples
420

↓

When the inspected sample is classified into the outlier category, extract a second set of features from the one or more regions of interest in the X-ray image
430

↓

Classify the inspected sample into a sub-category of a number of sub-categories based on the extracted second set of features and known second set of features associated with a number of outlier samples
440

Identify one or more reference objects for an object of interest to be inspected, each reference object having a same type and components as the object of interest
510

Generate a reference model for the object of interest based on one or more X-ray images of the one or more reference objects
520

Determine whether the object of interest is associated with one or more defects by comparing a first X-ray image of the object of interest to the reference model, the one or more defects being characterized by one or more pre-determined defect models, and, when the object of interest is associated with the one or more defects, the one or more defects are classified into respective defect categories based on the one or more pre-determined defect models
530

FIG. 5

METHODS AND SYSTEMS FOR DEFECTS DETECTION AND CLASSIFICATION USING X-RAYS

PRIORITY

This application claims the benefit under 35 U.S.C. § 119(e) of U.S. Provisional Patent Application No. 62/873,752, filed 12 Jul. 2019, which is incorporated herein by reference.

TECHNICAL FIELD

This invention relates to the high-speed examination and inspection of objects using X-rays.

BACKGROUND

Integrated circuits may be manufactured to include 3D or 2.5D structures. The inspection techniques using optical photons or electrons to inspect silicon wafers cannot be used to inspect 3D and 2.5D IC packages because they do not penetrate through the ICs, interposers, or Cu—Cu die to die bonding sufficiently to provide an internal view of the packaged ICs. Optical inspection methods are also not capable of performing inspection or metrology for partially packaged components, a critical requirement for process control. Since X-rays can penetrate through many layers of packaging, X-ray inspections may provide an internal view of the assembled device.

However, existing X-ray systems lack sufficient resolution and imaging speed to meet the needs for high-resolution, high-throughput IC and electronic packaging inspection. For example, traditional computed tomography (CT) using X-rays may need to take many slices of X-ray images of the inspected objects and use the large number of slices to construct 3D model of the object, and therefor is very slow and not suitable for inspecting integrated circuits.

SUMMARY OF PARTICULAR EMBODIMENTS

Particular embodiments described herein relate to systems and methods of using computer vision techniques or/and machine-learning (ML) models to identify and classify defects of inspected objects based on their X-ray images. In particular embodiments, for an object of interest, the system may select one or more reference objects (e.g., preceding parts or surrounding parts of the same manufacturing line, the same inspection line, or the same production batch) and generate a reference model based on X-ray images of these reference objects. These reference objects may be the same type of objects to the object of interest and may have the same components with the object of interest. The system may compare the X-ray image of the object of interest to the reference model. The system may flag the difference between the X-ray image of the object of interest and the reference model. The system may use one or more defect models to determine whether the object of interest is associated with one or more defects, and if it is, classify these defects into respective defect categories. The defect models may be associated with a number of features (e.g., characterized by corresponding parameters with associated thresholds) for characterizing respective defect types. Since the X-ray images of the reference objects may have the same or similar background noise pattern to the X-ray image of the object of interest, the system may eliminate or minimize the influence of the background noise on identifying and classifying defects by comparing the X-ray image of the object of interest to the reference model. The system may identify and classify defects in the object of interest based on a single X-ray image captured from a particular angle. When the defects could not be confirmed or classified based on a single X-ray image, the system may generate a second X-ray image of the object of interest from a second angle different from the first angle. When the defects could not be classified based on several X-ray images captured from several angles, the system may send the location information of the identified defects (or potential defects) to a second X-ray system, which could generate cross-section X-ray image at any locations and any angles. The second X-ray system may generate cross-section X-ray images for the object of interest based on the location information received from the first X-ray system and characterize and classify the defects based on the cross-section images. The second X-ray system may automatically send the characterization and classification information of the defects to the first X-ray system. The first X-ray system, after received the characterization and classification information, may use this information to update/improve the defect models or/and to re-train the machine-learning (ML) models. As a result, the system may gradually improve the precision and accuracy for identifying and classifying defects in the inspected objects of interest.

In particular embodiments, the system may use one or more machine-learning (ML) models to identify and classify the defects in the inspected objects of interest. The ML models may be trained by historical data (e.g., labeled samples for supervised training, un-labeled samples for un-supervised training). For example, the ML models may be trained using the labeled samples that are received from and classified by a second X-ray system. The ML models, once trained, may be fed with the samples to be inspected. The system may first extract a first set of features from X-ray images of the inspected samples. Then, the system may use a first ML model to classify the inspected samples into inliers (i.e., compliant samples) and outliers (i.e., non-compliant samples) based on the first set of features. For the non-compliant samples, the system may extract a second set of features from the X-ray images of the inspected samples and use a second ML model to classify them into respective defect categories based on the second set of features. For example, the system may extract N number of features of an object of interest from one or more X-ray images and characterize the object of interest in the N-dimensional feature space. The system may calculate a quality score for each inspected sample based on a distance of that sample to a reference point in the feature space and determine whether that sample is a compliant sample or non-compliant samples by comparing that quality score to corresponding boundary conditions. For the compliant samples, the system may use the quality score to measure the quantified quality of the inspected samples. Even though these samples are all compliant samples, some samples may have a higher quality (e.g., being closer in the feature space to a reference point or an average point) as indicated by a corresponding quality score. For the non-compliant samples, the system may use one feature or a combination of multiple features to characterize the inspected samples in the feature space and classify these samples into respective defect categories. For samples that cannot be classified into known categories, the system may generate a new category based on one or more associated features.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 2C illustrates an example process for using a reference model generated based on different sub-portions of the X-ray image to inspect an element of interest.

FIG. 4 illustrates an example method for classifying inspected samples using a two-step process.

FIG. 5 illustrates an example method for using a reference model generated based on X-ray images of adjacent objects to inspect an object of interest.

Figure 1A:
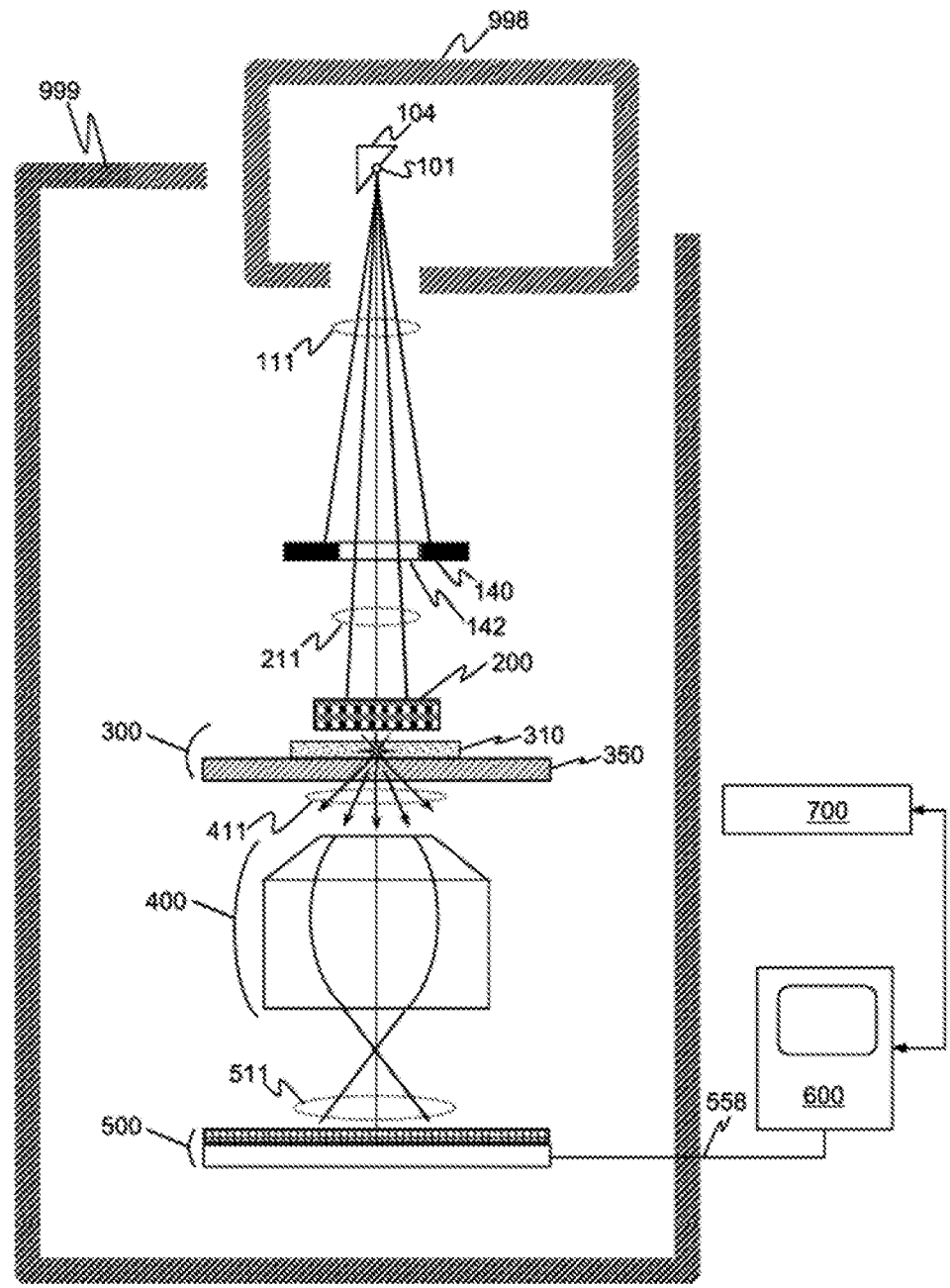
FIG. 1A illustrates an example X-ray imaging system.

Note: Elements shown in the drawings are meant to illustrate the functioning of the invention, and have not been drawn to scale.

DESCRIPTION OF EXAMPLE EMBODIMENTS

Automated High-Speed X-Ray Inspection System
X-Ray System Framework

The system and methods disclosed herein are related to a system or the use of a system that illuminates an object to be examined or inspected with X-rays, converts X-rays to visible (or near-visible) photons, forms an image of the visible (or near-visible) photons, and then converts the image into an electronic form. As such, the various embodiments of this X-ray image formation system will be presented first, followed by the various embodiments of methods and systems that utilize the X-ray imaging system.

Although many kinds of objects can be examined or inspected using the apparatus disclosed here, it is expected to be especially suitable for the examination and inspection of integrated circuit wafers and packaging assemblies. One example of these are silicon interposers, comprising silicon with multiple TSVs, but the invention can also be used for the inspection of an integrated circuit (IC) itself, a silicon interposer, a silicon dioxide interposer, a printed circuit board (PCB) with or without ICs already installed, a 3D IC package or assembly, a 2.5D IC package or assembly, a multi-chip module (MCM), a system-in-package (SIP) and other electronic microdevices or portion thereof that comprise microscopic structures. These may be examined as incoming materials, completed products, or as partially manufactured objects at any stage of their manufacture for the purpose of metrology, process control, inspection, or yield management.

Non-electronic devices with micro- or nano-structures, such as magnetic recording media, photonic structures and photonic crystals, metamaterials, etc., can also be examined and inspected using this invention. Capacitive sensors, such as fingerprint sensors, can also be examined. A particularly attractive feature of the apparatus is that it is possible to make non-destructive, high-resolution observations and measurements of features within an object that cannot otherwise be seen using electrons or optical photons, as are used in conventional metrology and inspection tools.

In general, objects suitable for use with this invention will comprise at least one flat side. Examples include: electronic circuits on semiconductor wafers, parts of wafers or selected areas on wafers; integrated circuit chips, dice, assemblies, packages, or portions thereof; micro-fluidic devices; micro-electro-mechanical systems (MEMS), including accelerometers, gyros, magnetic and capacitive sensors and the like; photonic devices, particularly those fabricated using planar waveguides; biological tissues, including stained samples; photomasks or templates for printing or fabricating any of the above mentioned devices; and solar cells, parts thereof or parts pertaining to solar cells. Other objects without flat sides may be observed and inspected as well, but the image quality may not be uniform for objects of irregular dimensions.

In particular embodiments, the X-ray inspection system as described in this disclosure may be a high-speed X-ray inspection system. In particular embodiments, the high-speed X-ray inspection system may have a higher measurement/inspection speed than traditional X-ray systems (e.g., 100 times faster than traditional X-ray systems). As an example and not by way of limitation, the high-speed X-ray inspection system may be capable of inspecting electronic components or devices with an image collection time of approximately 33 milliseconds. In particular embodiments, the X-ray inspection system as described in this disclosure may be an automated X-ray inspection system. In particular embodiments, the automated X-ray inspection system may include one or more computers or controllers and instructions stored in one or more computer media. The automated measurement process of the automated X-ray inspection system may be controlled by the computers or controllers by executing corresponding instructions. The automated measurement process of the automated X-ray inspection system may not need interventions from human operators and may be automatically performed following particular procedures.

In particular embodiments, the X-ray inspection system as described in this disclosure may use one more artificial intelligence (AI) modules and/or machine-learning (ML) models. In particular embodiments, the artificial intelligence (AI) modules may be or include any suitable methods, processes, and/or algorithm performed by one or more computing systems. In particular embodiments, the machine-learning models may be or include, for example, but are not limited to, a rule-based algorithm, a random forest model, a neutral network or any suitable machine-learning models. In particular embodiments, the X-ray inspection system as described in this disclosure may perform real-time measurements to one or more processes performed by another system (e.g., a drilling machine, a bonding tool, an assembling tool, or any suitable tools). In particular embodiments, the term "real-time measurements" may refer to measurements performed by the X-ray inspection system in parallel to an associated process (e.g., a drilling process, an assembling process, a bonding process, or any suitable processes) without slowing down the associated process. The X-ray inspection system may perform measurements and provide feedback to the systems performing the associated process in a speed higher than or equal to the speed of the associated process.

In particular embodiments, the X-ray inspection system as described in this disclosure may perform in situ and/or inline measurements to one or more other systems or tools (e.g., a drilling machine, a bonding tool, an assembling tool, or any suitable tools). In particular embodiments, the term "in situ measurements" may refer to measurements performed by the X-ray inspection system which is integrated with other systems. For example, the X-ray inspection system may be integrated into a drilling machine and perform in situ measurements to monitor the drilling process of the drilling machine. The in situ measurements may be automatically controlled by one or more computing systems coordinating the X-ray inspection system and the drilling machine. In particular embodiments, the term "inline measurements" may refer to measurements performed by the X-ray inspection system within the same process (e.g., a drilling process, an assembling process, a bonding process, or any suitable processes) performed by another system (e.g., a drilling machine, a bonding tool, an assembling tool, or any suitable tools). For example, during an assembling process performed by an assembling tool, the X-ray system may inspect the assembled components or devices during one or more steps of the assembling process. The components or devices may be automatically transferred from the assembling tool to the X-ray inspection system (e.g., by a robot arm) or may be manually transferred from the assembling tool to the X-ray inspection system (e.g., by a human operator). The X-ray inspection system may provide feedback information automatically to the assembling tool or to a human operator.

X-Ray Imaging System

FIG. 1A illustrates an example X-ray imaging system. An X-ray emitter 101 emits X-rays 111. These X-rays are then shaped into a collimated X-ray beam 211, in some embodiments using distance from the emitter 101 and a plate 140 with an aperture 142. This collimated X-ray beam 211 then illuminates an object 200 to be examined. The X-rays that are transmitted through the object 200 illuminate a scintillator assembly 300 comprising a scintillator 310 and, in some embodiments, a support 350 for the scintillator. The scintillator 310 absorbs a portion of the X-rays and releases some of the energy so absorbed with the emission of visible photons 411.

Using an optical system 400, a magnified image 511 of the visible photons 411 emitted by the scintillator is formed on an image detector 500. The image detector 500 converts the intensity of the magnified image 511 to an electronic signal. The image detector 500 can comprise an electronic sensor, such as a charge-coupled device (CCD), or another image sensor known to those skilled in the art. The electronic signal is transmitted to a system of electronics 600 that, in some embodiments can display the image results, and in some embodiments can store the image results and/or perform image processing algorithms on the image results in conjunction with a computer system 700.

For any source emitting ionizing radiation such as X-rays, it is often wise to provide shielding 998 around the X-ray source 100, and in some situations legally required for operation. Such shielding 998 can be a simple enclosure of shaped sheets of lead metal, or a more intricate design fabricated from any of a number of X-ray absorbing materials, such as lead-doped glass or plastic, that will be known to those skilled in the art. Shielding is desirable to keep random X-rays, either directly from the emitter 101 or reflected from some other surface, from causing unwanted effects, particularly spurious signals in the various electronic components used to control the system.

Likewise, for some embodiments, additional shielding 999 around the beam path may also be desired, and in some cases be legally required for operation. Such additional shielding 999 can be a simple enclosure of shaped sheets of lead metal, or a more intricate design fabricated from any of a number of X-ray absorbing materials such as lead-doped glass or plastic, that will be known to those skilled in the art. Additional shielding 999 is desirable to keep random X-rays, either directly from the emitter 101 or reflected from some other surface, from causing unwanted effects, particularly spurious signals in the various electronic components used to control the system.

Because certain image detectors 500 such as those comprising CCD sensors can be particularly sensitive to X-ray exposure, in some embodiments a portion of the scintillator assembly 300 can also be fabricated in whole or in part using a material, such as a lead-doped glass, which absorbs X-rays while transmitting the visible photons 411 emitted by the scintillator.

Figure 1B:
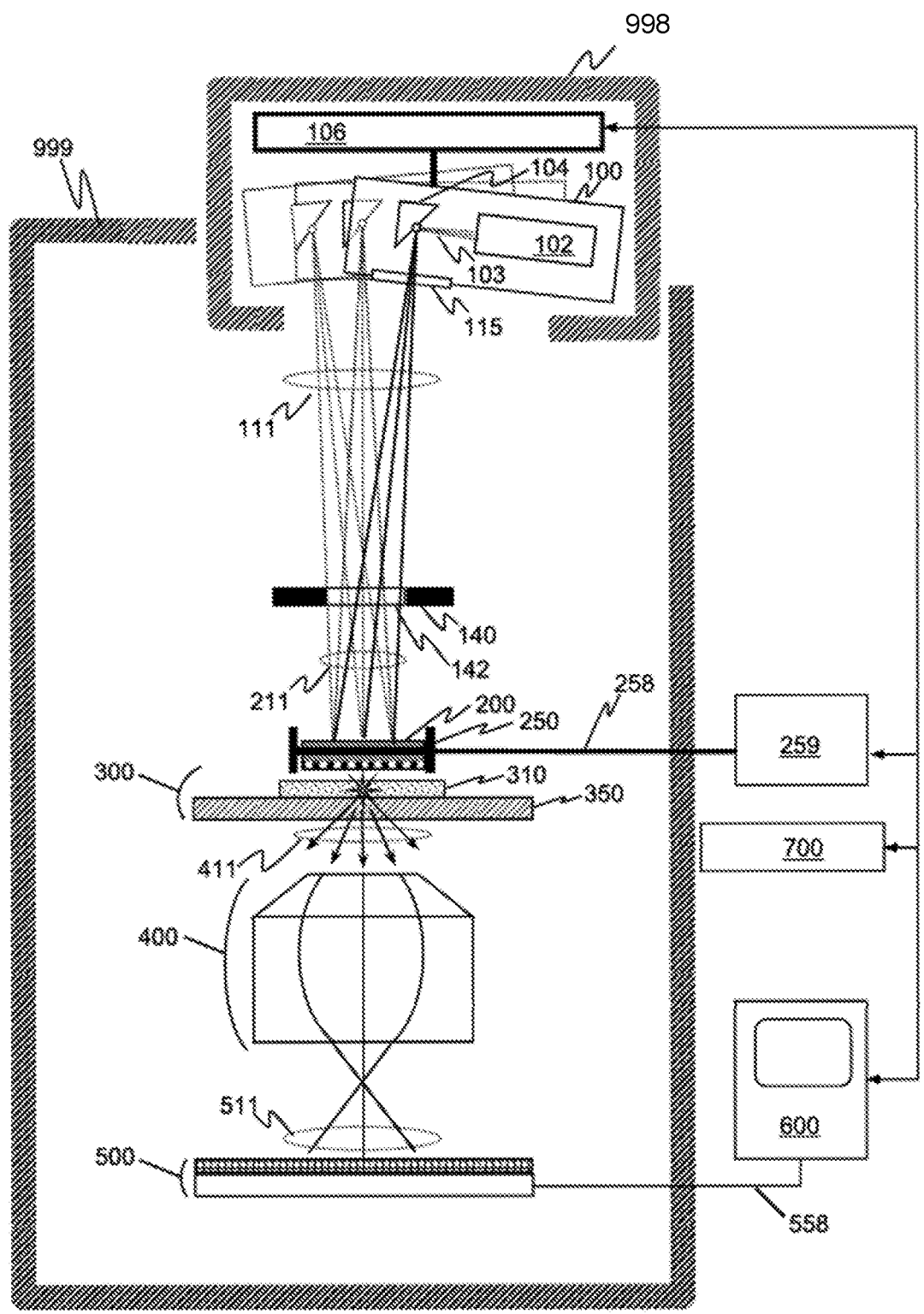
FIG. 1B illustrates an example X-ray system with movable X-ray source with respect to the inspected object for generating X-ray images at different directions.

FIG. 1B illustrates an example X-ray system with movable X-ray source with respect to the inspected object for generating X-ray images at different directions. As an example and not by way of limitation, the X-ray system may include a mount 106 that can move the position of the X-ray source 100 relative to the object 200, thereby changing the angle of incidence of the X-ray beam on the object. The mount 106 can be designed to allow the X-ray source 100 to swing in the x-z plane, in the y-z plane, or any other combination of axes. The source can also be moved along the z-axis to move the X-ray source 100 closer to the object 200. This may have the effect of making the beam brighter, increasing signal strength, at the cost of having an X-ray beam that is less collimated, reducing resolution. This effect may be reduced or eliminated by reducing the spot size of the X-ray source.

Motion of the X-ray source 100 using the mount 106 can be controlled by the computer system 700 several ways. In some embodiments, the source mount 106 may move the X-ray source 100 to a fixed location to allow an image to be captured. In some embodiments, the mount 106 can move the X-ray source 100 continuously as images are gathered, allowing the dynamic change of X-ray intensity as transmitted through the object 200 to be recorded as a function of illumination angle. In some embodiments, the X-ray emitter 101 can be moved to at least 10 degrees off the normal incidence angle. In some embodiments, further adjustment of the angle of incidence of the X-ray beam 211 on the object 200 can be achieved by coordinating the motion of the X-ray source 100 using the source mount 106 with the motion of the object 200 using the object mount 250. This coordination can be done manually or using the computer system 700. In some embodiments, the shielding 998 will be designed to enclose the X-ray source 100 and the source mount 106. In other embodiments, the shielding 998 can be designed to only enclose the X-ray source, with the mount 106 designed to move the shielding 998 as it moves the X-ray source 100. In some embodiments of the invention, multiple X-ray sources may be used to produce images with different angles of incidence. The X-ray sources may be fixed in space or moveable and may be operated sequentially or simultaneously. They can be operated manually or controlled by one or more computer systems 700.

In particular embodiments, the X-ray imaging system described in this disclosure may be an automated high-speed and high-resolution X-ray imaging system for generating X-ray images of electronic devices. In particular embodiments, the automated high-speed X-ray inspection system may include X-ray detectors with a high sensitivity for X-ray radiation, a very large number of grayscale levels (e.g., 10,000+ grayscale levels) with a large dynamic range, and a large number of pixels (e.g., greater than 29 megapixels) for generating high resolution images. In particular embodiments, the system may have a spatial resolution of lower than 2 μm, a field of view of 12 mm×12 mm, and a throughput greater than 3000 mm² per minute. More details about the X-ray system may be found in U.S. patent application Ser. No. 15/470,726, filed 27 Mar. 2017, which is incorporated herein by reference.

Automatic Defect Detection and Classification Overview

Problems Being Solved

In the electronics industry, cross-section X-ray images may be used for inspecting and analyzing electronic parts or devices. For example, a computational tomography (CT) X-ray imaging technique may be used to generate cross-section images of inspected parts. However, this technique requires generating a large quantity of images (e.g., images of many angles and slices), and therefore is relatively slow. Moreover, for CT imaging, the positions of the inspected sample, the X-ray source, and the X-ray detector must be precisely controlled to minimize distortion in the rendered cross sections. For high resolution X-ray CT imaging, the distance between the inspected sample and the X-ray source may need to be minimized and the sample may need to be rotated to create images from multiple angles. All these limitations may limit the size of the sample that can be inspected and the inspection speed of the inspection process. Furthermore, while the computational tomography imaging may be acceptable for some failure analysis applications, it is not suitable to be used by electronics manufacturers to inspect and analyze component attributes during manufacturing processes due to the lengthy processing time and the limitation on sample size. As a result, the limitations of the computational tomography imaging technique severely restrict its applications for inline inspection and in-situ monitoring of electronics manufacturing process.

In addition, traditional methods for inspecting electronics using X-ray images may rely on human operators to manually inspect X-ray images and identify defective parts. While some defects in X-ray images could be recognized by human operators, some other defects with subtle features could be difficult or impossible for human operators to recognize. Furthermore, manual inspection of X-ray images could be very slow and not suitable for high volume inspection applications. As electronics assemblies become more complex, the ability to screen out non-compliant products in the manufacturing process becomes more critical for the product quality control. Allowing products with potential defects to enter the supply chain could create serious concerns for the long-term reliability and safety problems.

Solution Summary

In particular embodiments, the automated high-speed X-ray inspection system described in this disclosure may inspect electronic parts or devices based on a limited number of X-ray images captured from different angles (e.g., a single top-down X-ray images, several X-ray images captured from different angles). Particular embodiments of the system may use computer vision techniques and a number of defect models to automatically identify and classify defects of the inspected parts. Particular embodiments of the system may use a machine-learning (ML) model, which is trained by historical data, to automatically identify compliant and non-compliant parts and classify the non-compliant parts into respective defect categories.

Benefits and Advantages

By using computer vision techniques and machine-learning models to analyze X-ray images, particular embodiments of the system may eliminate the need for human operators to manually inspect X-ray images to identify the presence of defects. Particular embodiments of the system may improve the detection rate and accuracy for identifying defects in the inspected devices and reduce over rejections. For example, the system may effectively and accurately detect some defects that are not detectable by the human eye because of limited capability in discerning a large number of grayscale levels by the human eye. Furthermore, using the automated processes and the machine-learning models to analyze X-ray images, particular embodiments of the system may reduce the cost of inspections to a very low level (e.g., 2 cents per part), increase the inspection speed (e.g., 100+ times faster than traditional CT imaging systems), and improve the coverage and repeatability of inspection.

By using a limited number of X-ray images, particular embodiments of the system may eliminate the need for large number of cross-section X-ray images for inspecting electronic parts or devices. Particular embodiments of the system may inspect electronic parts at a high speed and allow X-ray inspection to be performed in-situ and/or inline to the manufacturing processes. For applications that require screening hundreds or thousands of solder joints in a single integrated circuit package, particular embodiments of the system dramatically reduce the inspection time (e.g., from hours to a few seconds), and improve the inspection speed. For example, particular embodiments of the system may take a few seconds or less to generate a single X-ray image to perform the inspection while the traditional CT system may take many hours to create a large number of images for defect detection. Particular embodiments of the system may generate X-ray images at least 100 times faster than traditional CT system. In addition, particular embodiments of the system may be capable of inspecting electronic parts or devices with a much larger size than those of the traditional CT systems. Particular embodiments of the system may be capable of inspecting every electrical connection in a product with a throughput of 2 inches by 2 inches per minute. Particular embodiments of the system may include one or more X-ray detectors with high sensitivity and high resolution for generating X-ray images. For example, the X-ray images may have many more pixels (e.g., 29 megapixels) than traditional CT systems (e.g., 1-2 megapixels). Each X-ray image pixel may have a larger number of grayscale levels (e.g., 10000 to 65000 grayscale levels), which provide a large dynamic range. Furthermore, the system may include a high power X-ray beam source (e.g., 1000 W) for better X-ray penetrating capability and better image quality. All these features (e.g., high resolution, large dynamic range, high power X-ray source) improve the system's capability for inspecting electronic parts or devices with high speed and high accuracy.

Inspection Based on Reference Models Generated from Adjacent Objects

X-Ray Based Inspection and Defect Types

In particular embodiments, the automatic high-seed X-ray inspection system may be used on-line or/and in-situ to electronics manufacturing processes for inspecting the manufactured electronic parts or devices. The system may use X-ray images to identify defects that cannot be identified by visible light-based inspections. For example, the may inspect solder joints in flip chip or ball grid array packaging and these features of interest may be obstructed by other components (e.g., components of other layers) of the same part and cannot be inspected by visible light-based inspections. In particular embodiments, the system may be capable of identifying a wide range of problems associated with the inspected electronic parts, components, or devices including, for example, but not limited to, die chipping or cracking, standing or tomb stoning components, component misplacements, component misalignments, missing components, solder wetting (e.g., over-wet, non-wet), solder bridging (e.g., short), solder voids, oversized solder joints, undersized solder joints, missing balls, extra solder material, mislocated solder balls, surface-mounted component cracking, extra components, double components, rotated components, die tilting, non-wet copper connections, non-wet solders for surface-mounted components, insufficient solder for surface-mounted components, shorted surface-mounted connections, PCB via voids, top and bottom assemblies, embedded components, stack dies, die attachment coverages, etc.

Example Processes for Inspection Based on Reference Models

Figure 2A:
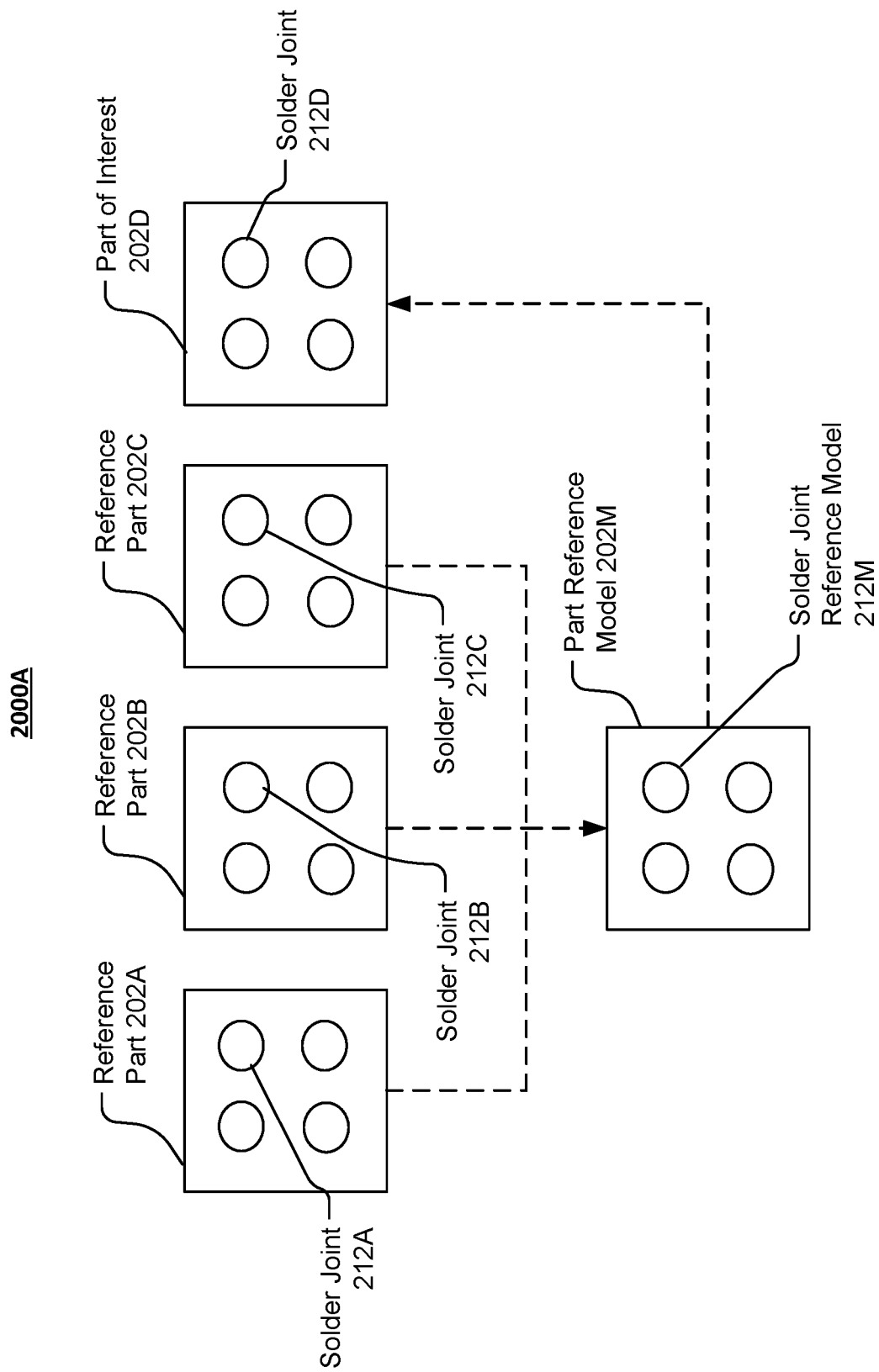
FIG. 2A illustrates an example process of using a reference model generated based on X-ray images of adjacent objects to inspect an object of interest.

FIG. 2A illustrates an example process 2000A of using a reference model generated based on X-ray images of adjacent objects to inspect an object of interest. In particular embodiments, for an object of interest, the system may generate a reference model as an inspection baseline for the object of interest based on X-ray images of one or more reference objects. The system may inspect the object of interest (e.g., an electronic part, device, or component) by comparing the X-ray image of the object of interest to the reference model and determine whether the object of interest has any defects based on the difference of the object of interest and the reference model. The system may determine that the object of interest has one or more defects when a difference between the sample of interest and the reference model is greater than a pre-determined threshold. In particular embodiments, the difference may include, for example, but is not limited to, a position difference, a size difference, a pattern difference, a signature difference, a profile different, a grayscale value difference, etc. As an example and not by way of limitation, the system may need to inspect an electronic part 202D in an inspection line (or an assembling line, a manufacturing line, a production batch, etc.) which includes a series of parts (e.g., 202A-202D). The system may select three parts 202A, 202B, and 202C that precede the part of interest 202D as the reference parts for generating the reference model 202M. The reference parts 202A, 202B, and 202C may be the same type of parts to the part of interest 202D and may have the same components (e.g., solder joints, conductive traces, layers) to the part of interest 212D. The reference model 202M may be generated based on an average or weighted average of the X-ray images of the reference parts 202A, 202B, and 202C. The part reference model 202M may include, for each component (e.g., each solder joint) of the part of interest 202D, a reference model generated based on the corresponding components of the reference parts. For example, the part reference model 202M may include, for the solder joint 212D, a solder joint reference model 212M which is generated based on the corresponding solder joints of 212A, 212B, and 212C.

Figure 2B:
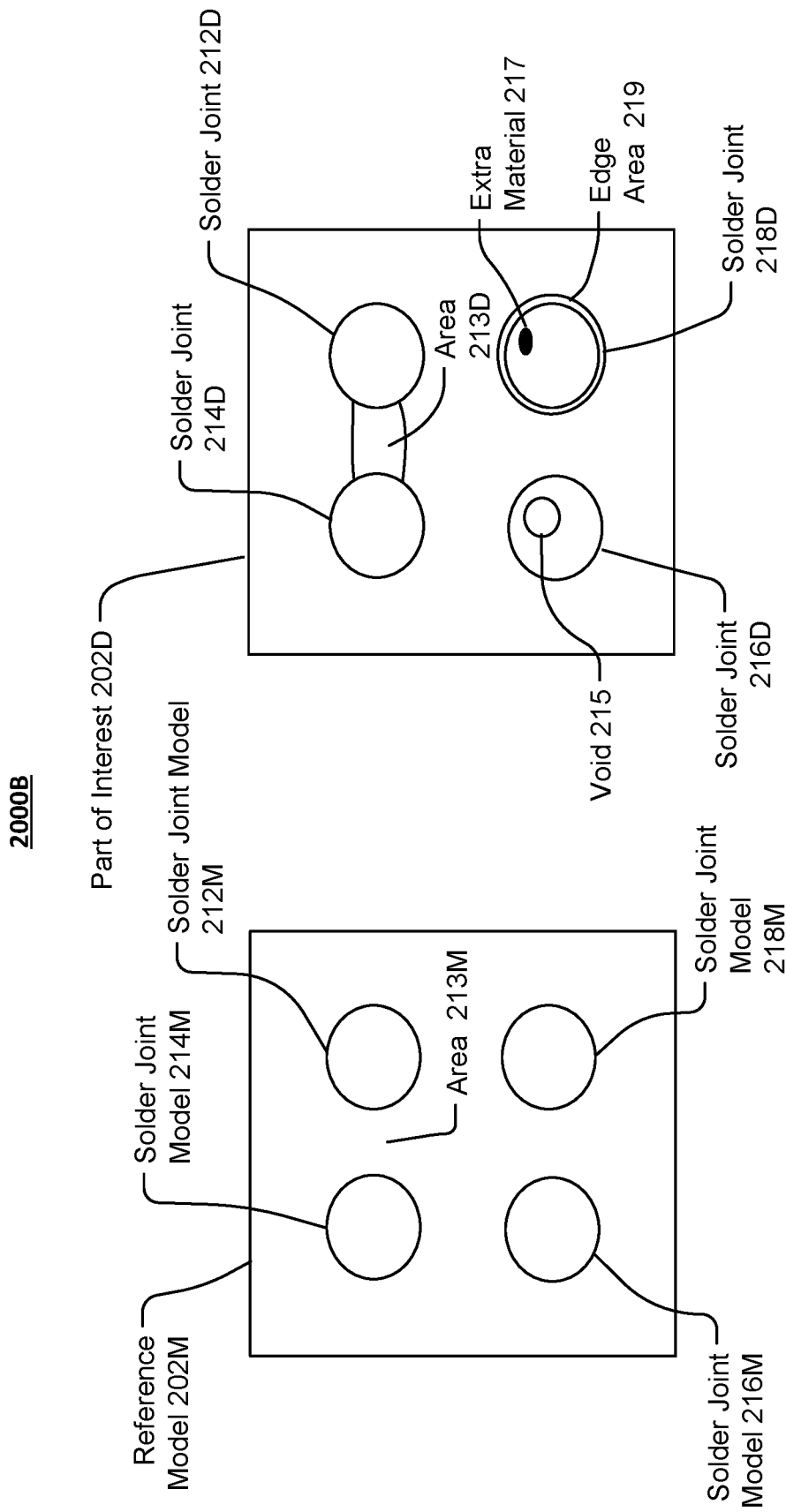
FIG. 2B illustrates an example process for using a reference model to identify different types of defects.

FIG. 2B illustrates an example process 2000B for using a reference model to identify different types of defects. In particular embodiments, the system may compare the X-ray image of the part of interest 202D to the reference model 202M to determine whether the part of interest 202D has any defects. For example, the system may determine that the part of interest 202D has one or more defects when the X-ray image of the part of interest 202D deviates from the reference model 203 for pre-determined thresholds. The system may use a number of defect models (e.g., non-wet, bridging, void, oversized balls, undersized balls, head-in-pillow, missing balls, etc.) to identify and classify the defects of the part of interest 212D. Each defect model may characterize an associated defect using one or more related features and particular parameters and thresholds. The thresholds may be associated with one or more parameters (e.g., material thickness, lengths, widths, heights, distances, angles, etc.) and one or more locations (e.g., within a solder joint area, at an edge or annular area of solder joint, between two or more solder joints, etc.) As an example, the system may use a bridging defect model, which is associated with a number of known features, parameters, and thresholds for characterizing bridging defects, to determine whether the part of interest has a bridging defect. As shown in FIG. 2B, the system may compare the area 213D between the solder joints 212D and 214D to the corresponding area 213M of the reference model 202M. The system may determine that the solder joints 212D and 214D, and the area 213D between them, match one or more features or/and characteristics of bridging defects as described by the bridging defect model. For example, the system may determine that the area 213D includes extra solder material compared to the reference area 213M in the reference model 202M. When the extra solder material thickness is greater than the reference area 213M for a pre-determined threshold and the extra material area is wider than the distance between the solder joints 212D and 214D, the system may determine that the solder joints 212D and 214D have a bridging defect in the area of 213D.

As another example, the system may use a void defect model, which is associated with a number of known features, parameters, and thresholds for characterizing void defects, to determine whether the part of interest has a void defect. The system may compare the solder joint 216D to the corresponding solder joint model 216M of the reference model 202M. The system may determine that the solder joint 216D matches one or more features or/and characteristics of void defects as described by the void defect model. The system may determine that the solder joint 216D includes an area that is lack of solder material comparing to the solder joint model 216M in the reference model 202M. The system may compare the solder material thick in the area of interest of the solder joint 216D to the solder joint model 216M. When the solder material thickness in the area of interest is less than the solder joint model 216M for a first pre-determined threshold, the system may determine that the solder joint 216D has a void defect 215. In particular embodiments, the system may determine the area of void by counting the number of pixels associated with the area of void. The system may compare the number of pixels to a pre-determined threshold to confirm the void defect when the number of pixels is greater than or equal to the pre-determined threshold, or to dis-confirm the void defect when the number of pixels is less than the pre-determined threshold. As another example, the system may use a non-wet defect model, which includes a number of known features and parameters with associated thresholds for characterizing non-wet solder joints, to determine whether the part of interest has non-wet solder joints. The system may compare the solder joint 218D to the solder joint model 218M of the reference model 202M. The system may determine that the solder joint 218D matches one or more features or/and characteristics of a non-wet solder joints as characterized by the non-wet solder joint model. For example, the system may determine that the solder joint 218D has an edge area or annular area 219 with thinner material thickness and a profile that matches the characteristics of non-wet solder joints. In the meantime, the system may determine that the solder joint 218D has extra material 217 in the inner area of the solder joint 218D. The system may determine that the solder joint 218D has a non-wet defect and the part of interest 202D has at least one non-wet solider joint.

Reference Object Selection

In particular embodiments, to generate the reference model for an object of interest, the system may identify one or more reference objects associated with the object of interest. The reference objects may be the same or similar type object as the object of interest (e.g., having the same or similar components or sub-components). For example, the object of interest may be an electronic part in a manufacturing line, an assembling line, or an inspection line and the reference objects may be neighboring parts that are of the same type and are in the same manufacturing line, assembling line, or inspection line. The reference parts may be the same type of parts as the part of interest and may have the same components or sub-components as the part of interest. For example, the reference parts may be parts of the same production batch that are manufactured during the same manufacturing process with the same manufacturing configuration (e.g., temperature, moisture, air pressure, machine settings). In the example as shown in FIG. 2A, three reference parts are selected as the reference objects. However, it is notable that the number of reference objects are not limited thereto. The number of the selected reference objects may be any suitable number (e.g., 1, 2, 3, or any integer number N). In particular embodiments, the reference parts may be or include parts that precede the part of interest, parts that surround the part of interest, neighboring parts of the object of interest, or any suitable parts that are similar enough to the part of interest to be used as reference parts.

Create Reference Model

In particular embodiments, the system may generate a reference model based on the X-ray images of the selected reference objects. As an example, the system may generate the reference model based on an average of three X-ray images of respective three reference objects. As another example, the system may generate the reference model based on a weighted average of the X-ray images of the selected reference objects based on relative locations of the reference objects to the object of interest. A reference object that is closer to the object of interest may have a higher weight than a reference object that is farer to the object of interest. As another example, the system may generate the reference model based on a weighted average of the X-ray images of the selected reference objects based on status of the reference objects. A reference object that has been determined to be defect-free (i.e., a compliant part) may have a higher weight than a reference object that has been determined to have one or more defects. It is notable that, in particular embodiments, the reference parts may include parts that are determined to have some defects. As along as the reference object do not all have the same defect at the same location, which is very rare, the reference parts with defects may not affect the inspection precision and accuracy. In particular embodiments, the selected reference parts may exclude the parts that have been determined to have some defects.

In particular embodiments, the system may characterize the inspected objects in a feature space which may have N dimensions corresponding to respective N features of the inspected objects, as will be discussed in later sections. The system may determine a quality score for each of the inspected object to indicate a distance of the inspected object to a reference point (e.g., which may correspond to an average or ideal point) in the feature space. The quality scores of the inspected objects may indicate quantified quality of the inspected objects (even if they are compliant parts). In particular embodiments, the system may generate the reference model based on a weighted average of X-ray images of the reference objects with the weights being determined based on the associated quality scores. For example, a reference part that has been determined to have a higher quality score may have a higher weight than a reference part that has been determined to have a lower quality score. As another example, a reference part that has a short distance in the feature space to a reference point may have a higher weight than a reference part that has a longer distance in the feature space to that reference point.

In particular embodiments, the reference model may be generated by integrating information (e.g., features such as profiles, gradients, trends, contrast levels, and parameters such as thickness, locations, lengths, widths, heights, distances) extracted from the X-ray images of the reference objects instead of using the average or weighted average of the X-ray images. As an example and not by way of limitation, the system may determine a profile of a component of interest (e.g., a solder joint, a connection pin) based on its profiles in multiple X-images of the reference objects and generate a reference model for that component of interest based on these profiles. As another example, the system may determine a location and a shape of a component of interest (e.g., a solder joint, a connection pin) based on its locations and shapes in multiple X-images of the reference objects and generate a reference model for that component of interest based on these locations and shapes.

Individualized Reference for Each Object of Interest

In particular embodiments, the reference model for an object of interest may be an individualized model for that object of interest generated based on the nearby reference objects of the object of interest. In particular embodiments, the system may inspect each of a batch of electronic parts (e.g., from a production line, an assembling line, an inspection line) sequentially. For a current part of interest, the system may generate a reference model using it nearby parts (e.g., three, four, five, or N preceding parts) as the reference parts. For the next part of interest to be inspected, the system may re-generate the reference model based on the nearby parts of the next part of interest to be inspected. The system may repeat this process (e.g., creating reference models based on neighboring samples and comparing the sample of interest to the reference model) and iterate to inspect the objects of interest in a sequence order using a moving window for selecting the baseline samples for each sample of interest. In particular embodiments, the system may inspect each of a batch of electronic parts (e.g., from a production line, an assembling line, an inspection line) parallelly. The system may parallelly generate a number of reference models for all parts of interest based on their respective nearby reference parts (e.g., three, four, or five preceding part) and parallelly inspect the parts of interest based on respective reference models.

Classify Defects Based on Similarity Scores

In particular embodiments, the system may generate a number of defect models for a number of defect types including, for example, but not limited to: non-wet solder joints, voids, bridging solder joints, oversized solder joints, undersized solder joints, missing balls, head-in-pillow defects, solder joints with irregular shapes, mis-aligned solder joints, mis-located solder balls, or any possible defects. In particular embodiments, the system may determine a similarity score for each inspected element of interest (e.g., soldier joints) based on one or more associated features and a corresponding defect model. A similarity score determined based on a particular defect model may indicate the likelihood that the element of interest has a defect as described by that particular defect model. As an example and not by way of limitation, the system may determine the quantified matching level between one or more features of the element of interest being inspected and the features of a particular defect as characterized by a corresponding defect model. Then, the system may determine the similarity score for that particular defect type based on the quantified matching level of the corresponding features. The system may compare the similarity score of each particular defect type to a corresponding threshold and determine that the element of interest has at least one defect of that particular defect type when the similarity score is greater than or equal to the corresponding threshold. In particular embodiments, the system may store a number of pre-determined defect models in a database. For each inspected element of interest (e.g., solder joints) of each inspected object of interest (e.g., electronic parts), the system may determine a similarity score for each defect type characterized by the pre-determined defect models stored in the database. Then, the system may compare these similarity scores to corresponding thresholds to determine whether the element of interest being inspected has defects of corresponding defect types.

In particular embodiments, each defect model may include a number of features (e.g., locations, trends, profiles, parameters with associated thresholds, etc.) characterizing that particular defect type. In particular embodiments, the threshold values of the defect models may be determined based on one or more heuristic rules by software algorithms or human operators. The system may determine a feature score for each feature associated an element of interest being inspected with respect to a corresponding feature in a corresponding defect model. The feature score of a particular feature may indicate the matching level between that feature and a corresponding feature of that particular defect model. The system may determine a combined score for an element of interest based on the scores of all related features. The system may compare the combined score to a pre-determined threshold to determine whether that element of interest has a defect of that particular defect type. As an example and not by way of limitation, the system may determine a first score for a first feature associated with a non-wet defect model. The first feature may characterize additional solder material in the center of a solder joint. The system may determine a second score for a second feature associated with the non-wet defect model. The second feature may characterize the absence of solder material in the edge or annular area of the solder joint. Then, the system may determine a combined score based on the first score for the first feature and the second score for the second feature. The system may compare the combined score to a pre-determined threshold to determine whether the solder joint being inspected is a non-wet solder joint. In particular embodiments, the system may classify the defects based on a rule-based algorithm, a random forest regression algorithm, or any suitable algorithms.

Background Noise and Interfering Elements

In particular embodiments, the X-ray image of the object of interest may include a number of features (e.g., edges, shapes, shadows, etc.) that are not elements of interest for inspection. For example, the inspected device may include a number of layers with each layer having a number of elements (e.g., PCB board layers, conductive traces, inter-layer connections, silicon substrates, integrate circuit stocks, solder joints of the same or other layers, plated-through vias, micro-bumps, solder masks, connections, strips, wires of other layers) which may overlap or intersect the elements of interest in X-ray images generated from a particular direction or angle (e.g., top-down X-ray images). These interfering features may create technical difficulties by introducing non-random noise patterns in X-ray images because the X-ray images are captured based on the X-ray penetrating all layers of the object of interest. As a result, the X-ray images may include a number of interfering elements which may interfere with the element of interest to be inspected. The non-random background noise patterns (which may be referred to as "pattern noise") may negatively affect the inspection processes of identifying and locating elements of interest and features associated with potential defects.

In particular embodiments, the system may determine whether an inspected object has one or more defects by comparing the object of interest to a reference model generated based on nearby objects (e.g., preceding parts, following parts, neighboring parts, surrounding parts) of the same production batch. One of the advantages for using the nearby objects as the reference objects is that the nearby objects may have the same or similar interfering patterns in the X-ray images (i.e., having the same or similar background noise patterns). By comparing the object of interest to the reference model created based on nearby objects, the influence of the background noise on the inspected element may be reduced to the minimum level. In particular embodiments, the system may eliminate or reduce the non-random background noise pattern in the X-ray image of the object of interest based on the X-ray images of the reference objects. The X-ray images, with reduced or eliminated background noise, may provide clear X-ray image for the element of interest with better contrast, and therefore, allow the system to identify and classify potential defects with better precision and accuracy. As an example and not by way of limitation, the system may subtract an average result of the reference object X-ray images from the X-ray image of the object of interest to reduce the background noise. The system may flag the differences in the X-ray image of the object of interest with respect to the X-ray images of the reference objects and identify/classify the potential defects based on the difference(s). As a result, the background noise influence on the defect inspection may be eliminated or reduced to the minimum level.

In particular embodiments, the system may use the machine-learning (ML) model (as will be discussed in later sections) to remove or reduce the influence from the background noise caused by these interfering features. For example, the ML model may be trained by historical data (e.g., labeled data or unlabeled data) to identify a particular element of interest at a particular layer from the X-ray images containing various types of interfering features and elements. As another example, the ML model may be trained to isolate the elements of interest from the interfering features and interfering elements in X-ray images. In particular embodiments, the system may use the computer vision techniques and ML models to isolate the elements of interest from the interfering features or interfering elements based on one or more characteristics. For example, the wires or conductor traces of a PCB board may have particular shapes (e.g., strip-shape with clear edges and uniform thickness), particular sizes, and/or particular dimensions. As yet another example, the solder pad may have a circular shape with particular sizes and may be located at particular locations (e.g., based on information accessed from a design blueprint).

Sub Portions of X-Ray Images as References

FIG. 2C illustrates an example process 2000C for using a reference model generated based on different sub-portions of the X-ray image to inspect an element of interest. In particular embodiments, the object of interest (e.g., components with a clean wafer) may not include interfering elements and the X-ray image may have clear images for the elements of interest with no background noise. In particular embodiments, the X-ray images of the object of interest may have a low background noise level or uniformly distributed background noise at a low level. For inspecting an element of interest (e.g., a solder joint) of an object of interest (e.g., an electronic part), the system may generate a reference model for that element of interest based on nearby reference elements (of the same object of interest) which are captured in the same X-ray image. As an example and not by way of limitation, for inspecting an element of interest 238 (e.g., a solder joint) of an object of interest 230 (e.g., an electronic part), the system may select the three nearby elements of 232, 234, and 236 as the reference elements for generating the reference model 231. Then, the system may compare the X-ray image of the element of interest 238 to the reference model 231 to determine whether the element of interest 238 is associated with any defects. The system may use one or more defect models to identify and classify potential defects associated with the element of interest 238. For inspecting another element of interest, the system may re-generate the reference model based on the nearby reference elements of that element of interest. In particular embodiments, the same method may be applicable to X-ray images of objects of interest having background noise that is uniformly distributed over the X-ray image. In particular embodiments, the same method may be applicable to X-ray images of objects of interest having background noise at a low level.

Optical Distortion and Parallax

Figure 2D:
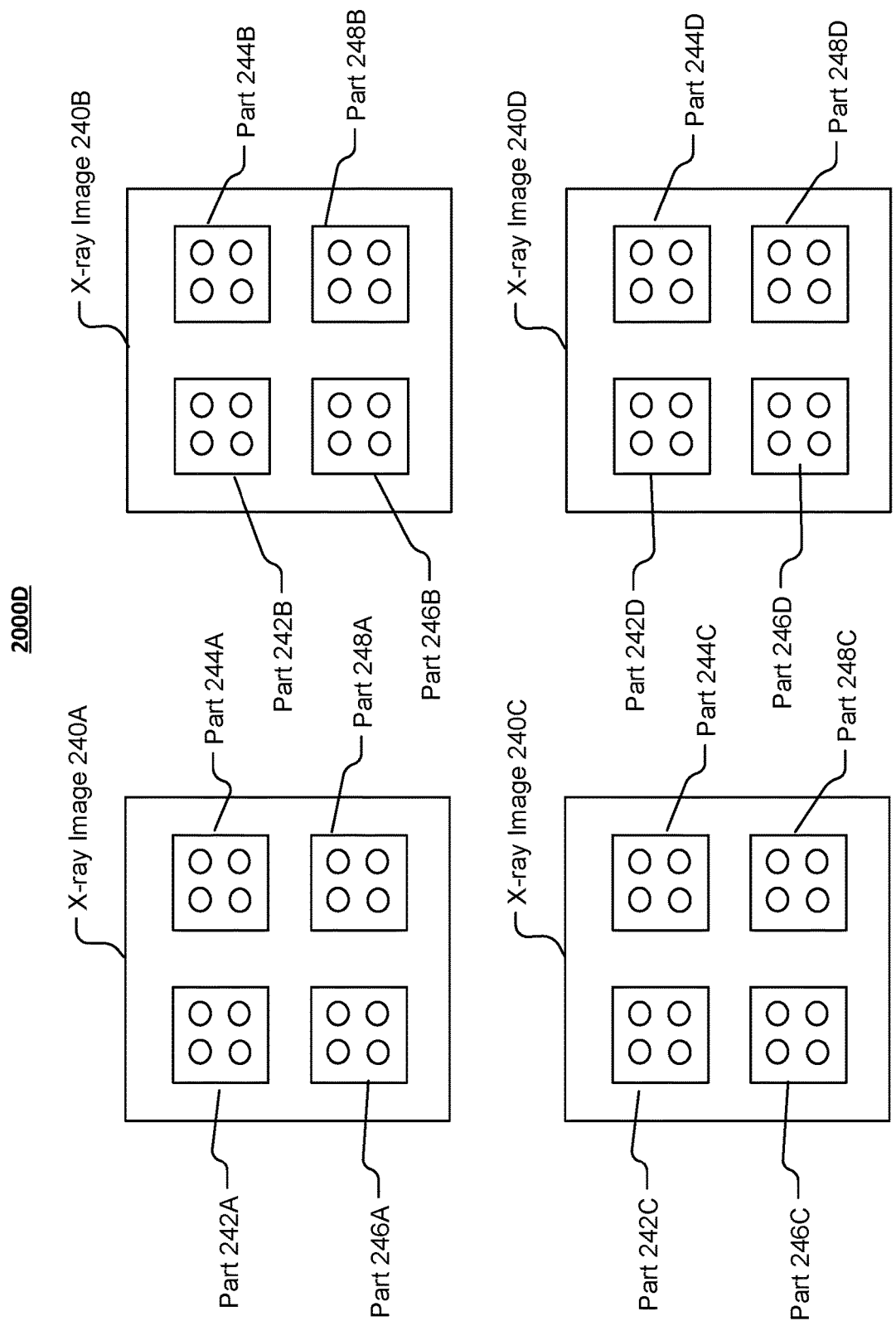
FIG. 2D illustrates an example process for generating reference models based on reference objects that are located at the same location of the detector's field of view.

FIG. 2D illustrates an example process 2000D for generating reference models based on reference objects that are located at the same location of the detector's field of view. In particular embodiments, the field of view (FOV) of the X-ray sensor or detector may cover a number of parts to be inspected. The system may generate X-ray images each covering a number of parts to be inspected. However, due to parallax effect and optical distortion, the same object may appear to be different in shape and size in X-ray images that are captured when the part is located at different locations of the detector's FOV. As an example and not by way of limitation, the system may generate the X-ray images of 240A, 240B, 240C, and 240D each covering multiple parts to be inspected. For inspecting part 248D, if the system uses the nearby parts 242D, 244D, and 246D of the same X-ray image 240D as the reference parts to create the reference model for part 248D, the reference model may not be accurate because of the parallax effect and optical distortion of lens are different for the locations of the four parts of 242D, 244D, 246D, and 248D. As a result, the precision and accuracy for identifying defective parts may be negatively affected.

To solve these problems caused by parallax effect and optical distortion, particular embodiments of the system may use the parts that are at the same location within the detector's FOV as the reference parts. In other words, the reference elements may be from different X-ray images but at the same location within the X-ray detector's FOV when these X-ray images are captured. As an example and not by way of limitation, for inspecting the part 242D in the X-ray image 240D, the system may select the part 242A in the X-ray image 240A, the part 242B in the X-ray image 240B, and the part 242C in the X-ray image 240C as the reference parts for generating the reference model. Because these reference parts are at the same location within respective X-ray images, their X-ray images may have the same distortion caused by the parallax effect and optical distortion of lenses. As a result, the influence of parallax and optical distortion on the reference model may be eliminated or reduced to minimum by generating the reference model based on the reference objects selected in this way.

Inspection Based on a Single Top-Down X-Ray Image

In particular embodiments, the automated high-speed X-ray inspection system may inspect an object of interest (e.g., electronic devices, parts, components, PCB boards) based on a single top-down X-ray image (or a bottom-up X-ray image). The system may determine material thickness of one or more elements of interest (e.g., solder balls, contacts, connections, pins, joints, etc.) within a PCB board or electronic package in the orthogonal direction to the image plane (or a reference plane of the inspected device) based on a single top-down X-ray image. For example, the system may determine the material thickness based on variation in X-ray absorption as represented by variation of image grayscale values. The system may use computer vision and computational analysis technologies to determine the material thickness distribution (e.g., profile or shape of associated elements of interest) based on one or more features in the single top-down image (e.g., edges, shapes, gradients, trends, grayscale values, etc.). Since defective solder joints exhibit differences in shape from compliant solder joints, particular embodiments of the system may use the variation in grayscale values to differentiate between defective and compliant solder joints.

As an example and not by way of limitation, the system may use computer vision technologies to inspect the objects of interest based on a top-down X-ray image of the object of interest and a number of defect models. The system may generate a number of defect models for different types of defect and store these defect models in a database. The system may use these defect models to identify and classify the defects in the inspected objects based on a single X-ray image of the object of interest, as described in other sections of this disclosure. As another example, the system may use a machine-learning (ML) model, which is trained by historical data, to identify, locate and classify defects in the inspected objects of interest based on a single X-ray image. The system may use the ML model to identify one or more elements of interest in the X-ray images, isolate the elements of interest from other interfering elements (e.g., elements of the same or other layers that may overlap or intersect the elements of interest) in the X-ray images. The system may identify one or more features (e.g., good connections, connections with different types of defects, etc.) associated with the element of interest (e.g., connections, solder balls, PCB layers, etc.) based on a single top-down image. Then, the system may use the ML model to determine whether the element of interest has one or more defects and, if any, classify that defects into respective defect categories.

Reduce False Positive Using a Second X-Ray Image

In particular embodiments, the system may determine whether an object of interest has one or more defects based on a single X-ray image of the object of interest captured from a first direction (e.g., a top-down direction, a substantially orthogonal direction to a plane of the inspected sample). As an example and not by way of limitation, the system may extract one or more first features from a top-down X-ray image and determine that there are one or more defects associated with the object of interest based on the one or more first features extracted from the signal top-down X-ray image. In particular embodiments, the one or more first features may include, for example, but are not limited to, a material thickness value, a material thickness variation, a material thickness profile, an element shape, an element size, a distance between the element of interest to another element, a position of an element of interest in the first X-ray image, a relative position of an element of interest to another element, a geometric signature associated with an element of interest, etc.

However, in some situations, the detection results of the defects may be false positive results due to background noise or interfering patterns in the X-ray image. In particular embodiments, the system may generate a second X-ray image of the object of interest at a second direction (e.g., an oblique direction) different from the first direction and use the second X-ray image to validate or invalidate the detected defective elements of the inspected sample. As an example and not by way limitation, particular embodiments of the system may generate a second X-ray image of the object of interest at an oblique direction and extract one or more second features from the second X-ray image or a combination of the first X-ray image and the second X-ray image. For example, the automated high-speed X-ray inspection system may determine the one or more second features by comparing the first X-ray image and the second X-ray image. In particular embodiments, the one or more second features may include, for example, but are not limited to, a stacking order of two or more layers, a position change of the element of interest, a shape change of the element of interest, a position change of an interfering element, a shape change of an interfering element, one or more grayscale value changes associated with the element of interest, one or more grayscale value changes associated with an interfering element, any difference between the first X-ray image and the second X-ray image, etc.

In particular embodiments, the system may confirm that the one or more defects are associated with the object of interest based one or more second features confirming the one or more first features. As an example and not by way of limitation, the system may detect a bridging defect between two solder joints based on a top-down X-ray image. The system may generate a second X-ray image of the object of interest at a different direction and may confirm that the bridging defect between the two solder joints is an actual a bridging defect. The system may confirm the detected defects and determine that these defection results are not false positive results. In particular embodiments, the system may report or flag the detected defective elements of the object of interest only if that defective element is confirmed by at least two X-ray images of the inspected sample generated at different directions. As another example, the system may flag a solder joint as a possible defective solder joint by comparing the X-ray image of that solder joint to the reference model but could not be 100% sure that it is a defective solder joint. The system may generate a second X-ray image of the object of interest from a second angle. The system may use information extracted from the second X-ray image of the object interest to confirm or dis-confirm whether that solder joint is a defective solder joint. And if it is actually a defective solder joint, the system may use information extracted from both the first and second X-ray images to classify that defective solder joint into the corresponding category.

In particular embodiments, the system may invalidate the determination that the one or more defects are associated with the object of interest based one or more second features invalidating the determination based on the one or more first features. As an example and not by way limitation, the system may detect a bridging defect between two solder joints based on the top-down X-ray image. The system may generate a second X-ray image of the inspected sample at a different direction and may identify that the "bridging defect" between the two solder joints is actually a back-dilled via which is vertically located in other layers different from the solder joints and is spatially located between the two solder joints (making them appear to be bridged from the top-down X-ray image) in the plane orthogonal to the top-down direction. The system may invalidate the detected bridging defects and determine that these defect results are false positive results. In particular embodiments, the system may report or flag the detected defective elements of the object of interest only if that defective element is confirmed by at least two X-ray images of the inspected sample generated at different directions.

Reduce False Negative Using a Second X-Ray Image

In particular embodiments, in some situations, the system may have false negative results (e.g., not identifying defects when there are one or more defects) due to a number of factors (e.g., noise, interfering patterns, element size variations, element location variations, etc.). In particular embodiments, when the system determines that there are no defects in the inspected element based on a first X-ray image (e.g., a single top-down X-ray image), the system may perform another inspection by generating and analyzing a second X-ray image of the inspected sample from a different direction. In particular embodiments, the system may determine that there are no defects in the inspected sample only after being confirmed by at least two X-ray images of the inspected sample generated at different directions. In particular embodiments, in some situations, the system may have false negative results from the inspection based on a single top-down X-ray image. The system may perform one or more further inspections by adjusting one or more parameters used by the computer algorithms or models. As an example and not by way of limitation, the automated high-speed X-ray inspection system may fail to detect one or more defective elements because these elements fall beyond the parameter ranges used by the computer algorithms. For example, the automated high-speed X-ray inspection system may fail to detect one or more defective solder joints because these solder joints have usual large size variation of 70±60 µm which is beyond the parameters range of 70±5 µm used by the computer algorithms. The automated high-speed X-ray inspection system may adjust the parameter ranges from 70±5 µm to the 70±60 µm and re-inspect the inspected sample using the adjusted parameters. The automated high-speed X-ray inspection system may effectively detect the defective elements that are missed during the initial inspection by using the adjusted parameters.

Classify Defects Based on a Second X-Ray Image

In particular embodiments, the system may identify one or more defects associated with the objects of interest based on a single X-ray image captured from a first angle (e.g., top-down) but may not able to classify the identified defects into respective categories. The system may capture a second X-ray image for the inspected object of interest from a second angle different from the first angle. The system may extract features related to the elements of interest based on both the first and second X-ray images to confirm or disconfirm the identified defects and to classify the defects into respective categories. As an example and not by way of limitation, the system may flag a solder joint as a defective solder joint based on a determination that the X-ray image of that solder joint deviates from the reference model for a pre-determined threshold but could not determine the defect type of that solder joint based on that X-ray image only. The system may generate a second X-ray image of the object of interest from a second angle. The system may use information extracted from both the first and the second X-ray images of the object interest to determine the defect type of that solder joint.

In particular embodiments, the system may generate a second X-ray image for the inspected device from an oblique angle to the image plane or device reference plane and use this second X-ray image to determine one or more features (e.g., staking order of multiple layers) and parameters (e.g., material thickness, shapes, sizes, distances, relative positions, profile variations, gradients, etc.) in addition to the top-down X-ray image. For example, the system may use computer vision and computational analysis techniques to process the top-down X-ray image and the X-ray image generated from an oblique angle to determine the stacking order of multiple layers of a PCB board and/or compute the distances between features in the orthogonal direction to the image plane or device reference plane. With a given angle of the oblique direction, the system may identify and measure the features along the axis orthogonal to the image plane or the device reference plane, the relative displacements of features, and/or the distances between the features in the orthogonal direction.

In particular embodiments, the system may capture several X-ray images of the object of interest from different angles to identify and classify potential defects. The system may determine one or more features (e.g., sizes, shapes, relative positions, stacking orders, distances, etc.) of one or more elements of interest based on X-ray images generated from different directions or angles. The system may identify and classify defects of the object of interest based on these features without relying a large number of X-ray images (e.g., for each slice) for cross sections as the traditional CT technologies, and therefore greatly improve the inspection speed. In particular embodiments, the system may determine one or more features (e.g., edges, shapes, sizes, grayscale values, gradients, trends, etc.) of the inspected elements based on one or more features or attributes of a group of grayscale values in the X-ray images. For example, a sharp edge in the X-ray image may correspond to a sharp edge of the element along the X-ray direction from which this particular X-ray image is generated. As another example, an edge or shape with gradually changing grayscale values may correspond to a gradually changing edge or shape of the element.

Classify Defect by a Second X-Ray Tool

In particular embodiments, the system may identify one or more defects (e.g., by comparing the object of interest to the reference model generated based on nearby reference objects) based on a single X-ray image captured from a particular angle or several X-ray images captured from several angles. However, in some scenarios, the computer vision techniques used by the system may not be able to accurately classify the identified defects based on these limited number of X-ray images. Moreover, when machine-learning (ML) models are used for identifying and classifying defects, the machine-learning (ML) models may need to be trained by enough labeled defect samples before they can effectively identify and classify defects. To solve these problems, in particular embodiment, the automatic high-speed X-ray inspection system (referred later as the first X-ray system) may automatically send the location information of the identified defects or possible defects to a second X-ray system (which could be a CT system for generating cross section X-ray images). The second X-ray system may receive the location information of the defects or possible defects and use that location information to generate one or more cross-section X-ray images for the inspected object. Since the second X-ray system has the location information of the defects or possible defects, the second X-ray system may not need to generate a large number of cross section X-ray images. Instead, the second X-ray system may only generate cross section X-ray images at or near the locations of the defects or possible defects as identified by the first X-ray system. Therefore, even the second X-ray system which could be a CT X-ray system is involved, the processes and methods for inspecting electronic parts may still many times faster and more efficient than the traditional methods which rely on a large number of cross-section X-ray images.

In particular embodiments, the second X-ray system may confirm or dis-confirm the possible defects in the object of interest as determined by the first X-ray system based on the cross-section X-ray images. In particular embodiments, the second X-ray system may classify the defects of the object of interest and automatically send the classification information to the first X-ray system. In particular embodiments, the second X-ray system may use software with classifier algorithms (e.g., random forest regressions), machine-learning (ML) models (e.g., convolutional neural networks) to classify the defects of the object of interest. In particular embodiments, the second X-ray system may characterize the defects of the object of interest and automatically send the characterization information (e.g., one or more features associated with a particular defect type) and classification information of the defects to the first X-ray system. In particular embodiments, the second X-ray system may allow human experts to inspect the cross-section X-ray images of the object of interest to characterize and classify the defects based on human knowledge. In particular embodiments, the first X-ray system may receive the classification information and the characterization information from the second X-ray system and may use the received information to update/improve the defect models or/and to train machine-learning (ML) models (as described in later sections of this disclosure).

Two-Step Process for Sample Classification

Two-Step Process Overview

In particular embodiments, the system may use a two-step process to classify the inspected samples. In particular embodiments, the two-step process may be implemented by using one or more computer vision algorithms with a number of pre-generated defect models (e.g., accessed from a database). In particular embodiments, the two-step process may be implemented by using one or more machine-learning (ML) models. In the first step, the system may classify the inspected samples into inlier samples or outlier samples. The inlier samples may be the samples that are statistically similar to the compliant samples. The outlier samples may be the samples that are statistically different from the compliant samples. The inlier and outlier samples may be classified based on a comparison between a first set of features extracted from the X-ray images of the inspected samples and corresponding features of compliant samples. In the second step, the system may classify the outlier samples into false positives or different defective types based on the statistical analysis. The classification of false positives and different defective types may be based on a comparison of a second set of features extracted from the X-ray images of the inspected samples and the respective features of the positive false model and different defect models.

Extracted Features

In particular embodiments, the features of the first set of features or/and the second set of features extracted by the system may include, for example, but are not limited to, one or more component dimensions (e.g., diameter, length, width, height, thickness), component areas, material distributions, profile gradients, positions, distances to other components, relative positions or stacking orders to other components, one or more variations cross multiple X-images generated at different directions (e.g., diameter variations, length variations, width variations, height variations, area variations, shape variations, position variations, displacements, alignment variations), one or more characteristics (e.g., relative amplitude differences, changing trends), rates of change of grayscales in X-ray images, curvatures of curved lines, gradients of one or more edges, one or more characteristics of surrounding areas, etc. In particular embodiments, the first set of features and the second set of features may each include a combination of one or more features as described above. In particular embodiments, the second set of features may be different or partially different from the first set of features. In particular embodiments, the second set of features may be the same as the first set of features.

Inline/Outlier Classification

Figure 3A:
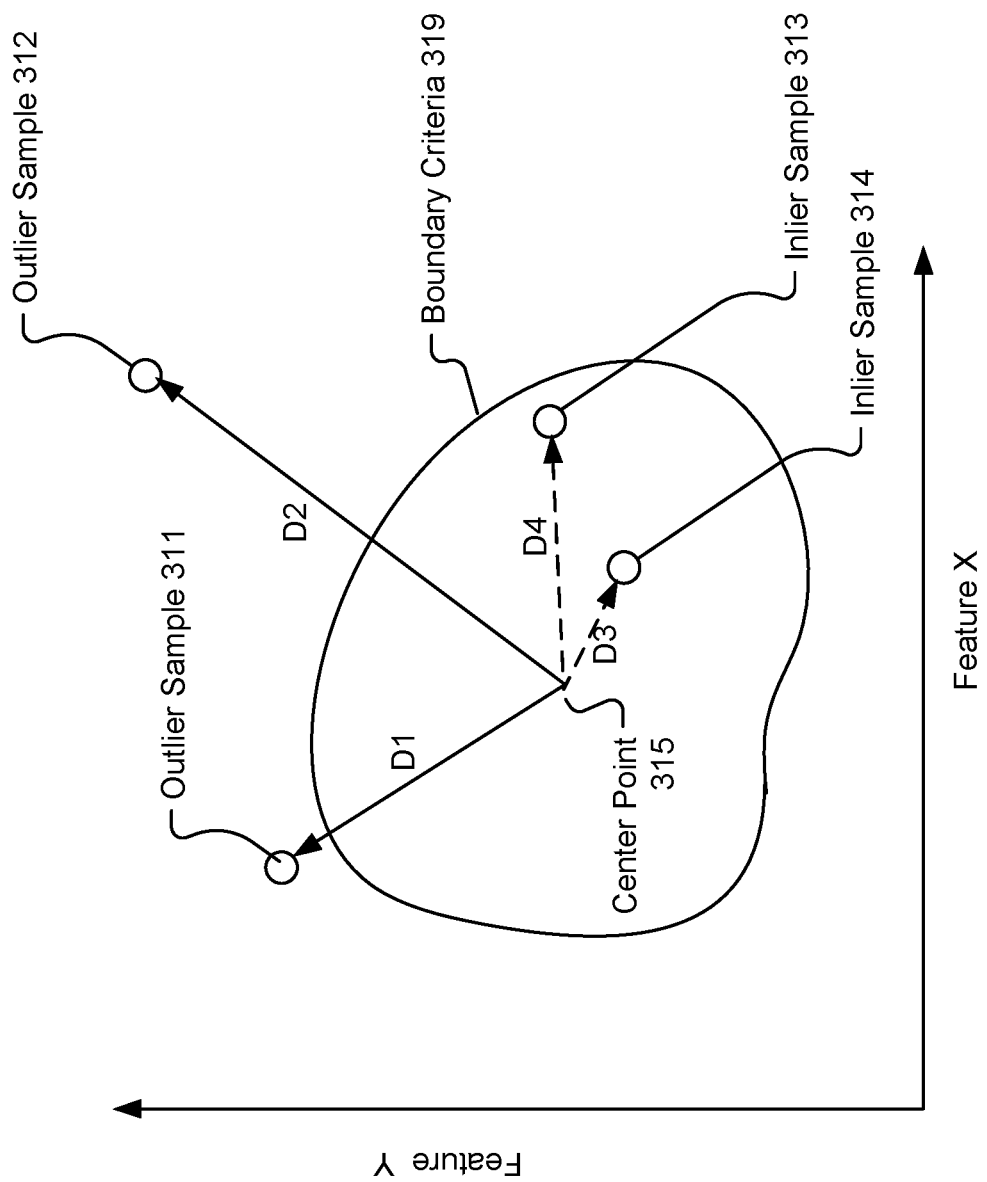
FIG. 3A illustrates an example process for classifying inspected samples into inlier samples and outlier samples based on a first set of features.

FIG. 3A illustrates an example process for classifying inspected samples into inlier samples and outlier samples based on a first set of features. In particular embodiments, the system may determine an N-dimensional feature space based on the first set of N features. The system may generate an inlier sample model in the feature space. The inlier sample model may be characterized in the feature space using one or more criteria that characterize the similarity of the inlier samples using distances in the features space. For inspecting new samples, the system may extract the corresponding features from the X-ray images of the inspected samples, compare those extracted features to the inlier sample model in the feature space, and classify the inspected samples into inlier samples and outlier samples. As an example and not by way of limitation, the inlier sample model may include boundary criteria 319 which is characterized in the feature space by two features (e.g., feature X and feature Y). The system may perform statistical analysis (e.g., using computer algorithms or machine-learning models) to determine the locations of the inspected samples in the feature space and the distances of the inspected samples to the inlier samples. For example, the system may determine the inspected samples 311 and 312 are outlier samples because they are out of the boundary criteria 319 in this feature space. As another example, the system may determine that the inspected sample 313 and 314 as inlier samples because they are within the boundary criteria 319.

Quality Metric Based on Distance in Feature Space

In particular embodiments, the system may determine a quality metric based on the distance of the inspected samples to a reference point 315 (e.g., a center point or an average point of the inlier samples) in the feature space. The reference point may correspond to an average or a weighted average of the inlier sample model corresponding to compliant samples. The system may quantitively evaluate the quality of the inspected samples based on the quality metric. As an example and not by way of limitation, the system may determine distance values of D1, D2, D3, and D4 for the inspected samples 311, 312, 312, and 314, respectively, with respect to the center point 315 of the inlier sample models. The system may determine that, although the samples 313 and 314 are both inlier samples, the sample 313 has a smaller distance D3 to the average center point 315 than the sample 314 (which has distance D4). The system may determine that the sample 313 may have a better quality than the 314 as measured by this quality metric. Since the sample 314 is close the boundary criteria 319, the system may determine that the sample 314 may have high reliability risk in long term although it may be fully functional at the time of this inspection.

In particular embodiments, the system may predict, for each inspected sample, an estimated life time based on the quality metric and predict a possible failure mode in future based on a corresponding location of that sample in the feature space. For example, the system may determine the estimated life time based on the length of the distance vectors (e.g., D1, D2, D3, and D4) and determine the possible failure mode based on the direction of the distance vectors (e.g., D1, D2, D3, and D4). Similarly, the system may determine that, although the samples 311 and 312 are both outlier samples, the sample 312 has a larger distance D2 to the average center point 315 than the sample 311 (which has distance D1). The system may determine that the manufacturing process of the sample 312 may have a larger deviation from a reference manufacturing process which produces compliant samples. It is notable that the two dimensional feature space as shown in FIG. 3A is for example purposes only, and the feature space is not limited thereto. For example, the feature space may be a N-dimension space defined on N features of the first set of features. It is notable that the boundary criteria as described in FIG. 3A is for example purposes only, and the boundary criteria is not limited thereto. For example, a boundary criterion may be based on a single feature or a combination of any number of features of the first set of features.

Defect Type Classification

Figure 3B:
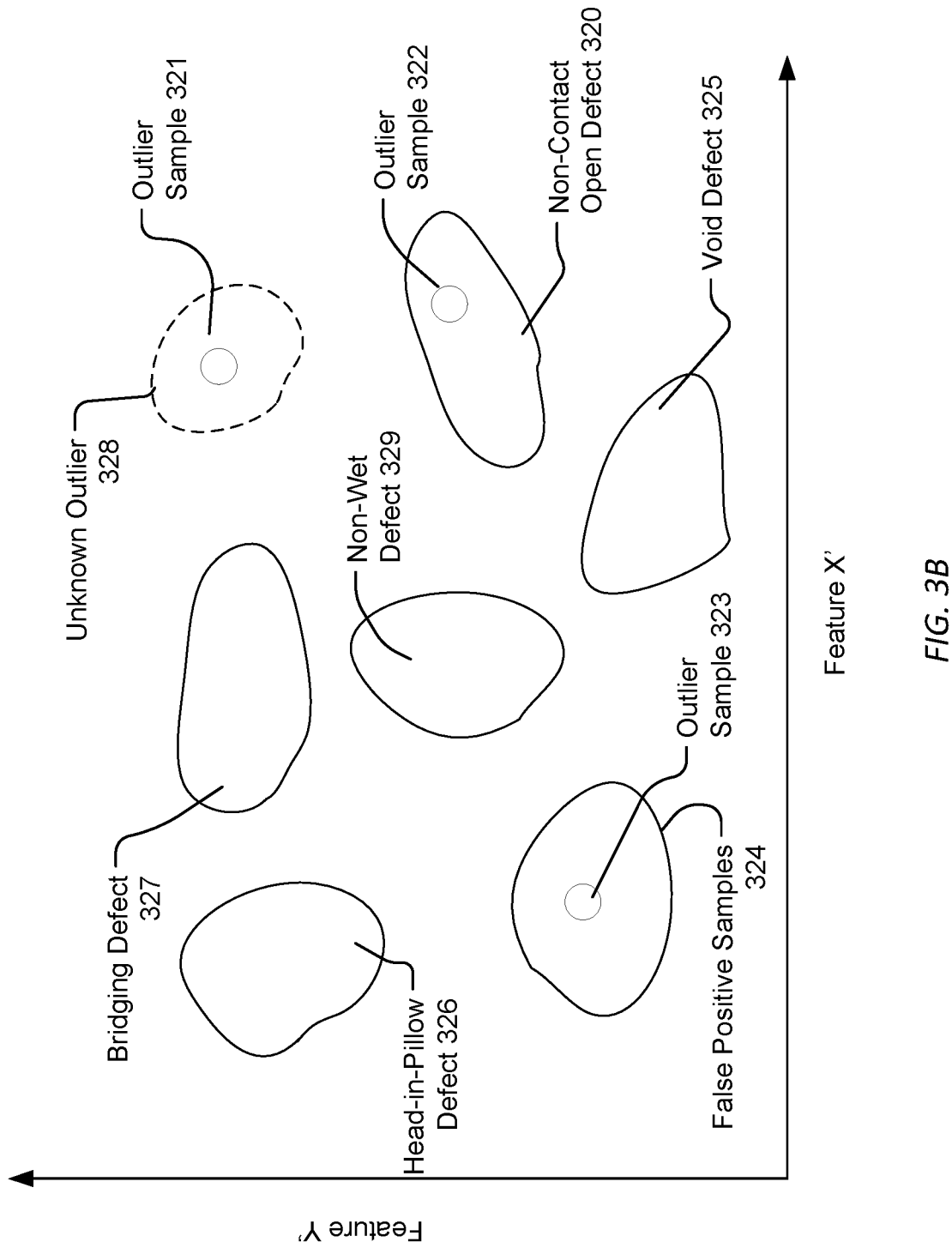
FIG. 3B illustrates an example scheme for classifying inspected samples into different sub-categories based on a second set of features.

FIG. 3B illustrates an example scheme for classifying inspected samples into different sub-categories based on a second set of features. In particular embodiments, the system may generate different outlier sample models in a feature space based on a second set of features including M features. The outlier sample models may be characterized in the feature space (e.g., a M-dimension space based on M features of the second set of features) using one or more criteria that characterize the similarity of the outlier samples. In particular embodiments, the second set of features may be a different set of features from the first set of features. In particular embodiments, the second set of features may include at least one feature which is not include in the first set of features. In particular embodiments, the second set of features may have one or more shared features with the first set of features. In particular embodiments, the second set of features may include a different combination of feature for describing the feature space. During the inspection process, the system may extract the corresponding features from the X-ray images of the inspected samples, compare those extracted features to the outlier sample models in the feature space, and classify the outlier samples into different sub-categories.

As an example and not by way of limitation, the system may (e.g., using computer algorithms or machine-learning models) generate a number of outlier sample models in the feature space. The outlier models may include, for example, but are not limited to, a false positive model 324, a void defect model 325, a non-contact open defect model 320, a non-wet defect model 329, a head-in-pillow defect model 326, a bridging defect model 327, models for unknown defects 328, etc. The system may determine the corresponding locations of the outlier samples in the feature space and classify the outlier samples into different categories. For example, the outlier sample 321 may be classified as an unknown outlier since it is identified as an outlier sample during the first step of the two-step process, but it does not fail into any sub-categories in the feature space of the second set of features. As another example, the outlier sample 322 may be classified as non-contact open defect 320 since it falls in the boundary criteria of the non-contact open defect 320. As yet another example, the outlier sample 323 may be classified into the false positive category because it falls in the boundary criteria of the false positive category 324. It is notable that the outlier sample models as shown in FIG. 3B are for example purposes only, and the models are not limited thereto. For example, the models may be based on a feature space described by any number of features of the second set of features. In particular embodiments, the system may generate new models for the outlier samples with unknown defects based on the new knowledge learned by the computer algorithms, machine-learning models, or/and inputs from human operators. In particular embodiments, the newly classified samples may be used for further updating exiting models or/and training of machine-learning models to improve the classification accuracy and precision over time.

Two-Step Sample Classification by Machine-Learning Model

In particular embodiments, one or more computing systems associated with the automated high-speed X-ray tool may use one or more machine-learning (ML) models to process the X-ray images and classify the inspected samples. As an example and not by way of limitation, the system may use a first machine-learning model, which may be trained by un-labeled samples, to classify the inspected samples into an inlier category (e.g., compliant samples) and an outlier category (e.g., non-compliant samples or samples that are statistically different from the compliant samples). The inspected samples may be classified by the machine-learning models based on a first set of features determined based on X-ray images of the inspected samples. For outlier samples, in particular embodiments, the system may use a second machine-learning (ML) model, which may be trained by labeled samples of different defect types, to classify the outlier samples into a number of sub-categories (e.g., false positives, void defects, non-wet defects, non-contact open defects, head-in-pillow defects, bridging defects, misalignments, etc.) based on a second set of features determined based X-ray images of the inspected samples. In particular embodiments, the second set of features may be different features from the first set of features. In particular embodiments, the second set of features may share some features with the first second of features.

In particular embodiments, by using two machine-learning (ML) models for inlier/outlier classification and sub-category classification, the system may allow each of the two models to be re-trained and updated without negatively affecting the accuracy and precision of the other model. For example, the system may periodically receive labeled samples of different defect types from a second X-ray tool (e.g., a CT x-ray system) and use the newly received labeled samples to re-train the second machine-learning (ML) model for classifying different defect types without affecting the first machine-learning model (ML) for classifying inlier/outlier samples. As another example, the first machine-learning (ML) model for classifying inlier/outlier samples may be re-trained by new samples (e.g., unlabeled samples) without affecting the second machine-learning (ML) model.

In particular embodiments, the system may use a machine-learning model to automatically classify the inspected components into inlier samples (e.g., compliant or qualified samples) and outlier samples (e.g., samples that are statistically different from the inlier samples) based on a first set of features. Then, the system may use the same machine-learning model to classify the outlier samples into a number of defect types (e.g., false positives, voids, non-wet solder connections, non-contact open connections, head-in-pillow defects, bridging connections, misalignments, etc.) based on a second set of features, which could be different from the first set of features. In particular embodiments, the system may use a computer vision algorithm to extract the features of the inspected samples from X-ray images and feed the extracted features into the machine-learning (ML) models, which are trained based on features of corresponding training samples. In particular embodiments, the system may use a separate machine-learning (ML) for extract the features of the inspected samples from X-ray images and feed the extracted features to another machine-learning (ML) model for identifying and classifying samples. In particular embodiments, the system may directly feed the X-ray images of the inspected sample to the same machine-learning models which may extract the features of the inspected sample from the X-ray image, identify, or/and classify any defects associated with the inspected sample.

ML Model Trained with Labeled or Un-Labeled Samples

In particular embodiments, the machine-learning model may be trained using unsupervised training based on a training population including unlabeled samples. During the unsupervised training process, the machine-learning model may determine a first set of features based on the X-ray images of the training population and build models for different sample categories based on these features. The ML models may use one or more techniques (e.g., clustering, anomaly detections, associations, autoencoders, etc.) to automatically find useful features for classifying inlier samples and outlier samples. The features may numerically represent the characteristics or properties of the regions of interest in the X-ray images. During the training process, the machine-learning model may adjust a number of parameters or weighting factors of the models to learn the hidden patterns or grouping of the training samples. The machine-learning model may group the training samples into different segments or clusters based on similarity of one or more features of the first set of features.

During the inference process, the X-ray images of inspected samples may be fed to the trained machine-learning model. The machine-learning model may cluster the inspected samples into various of clusters or categories (e.g., inlier samples and outlier samples). For example, the machine-learning model may identify any samples that are statistically similar (e.g., based on one or more features of the first set of features) to most of the training samples as inlier samples and may identify samples that are statistically different (e.g., based on one or more features of the first set of features) from most of the training samples as outlier samples, As another example, the machine-learning model may identify samples that are statistically similar (e.g., based on one or more features of the first set of features) to an average or a weighted average of training samples as inlier samples and identify samples that are statistically different (e.g., based on one or more features of the first set of features) from an average or a weighted average of training samples as outlier samples.

In particular embodiments, the machine-learning model may be trained using supervised training process based on a training population including known inlier samples and known outlier samples of different types (e.g., known false positives and samples with known defective types). The known inlier samples and outlier samples (of different types of the training population) may be labeled by human experts before the training process (e.g., received from a CT X-ray system). During the supervised training process, the machine-learning model may determine a second set of features from the X-ray images of the training population (with known or labeled defects) to characterize each sample category (e.g., false positives, defective samples of different types). The features may numerically represent the characteristics or properties of the regions of interest in the X-ray images. The models for different sample categories of the training population may be created in feature space by the machine-learning (ML) algorithm. The models for different sample categories may include a combination of a number of weighting parameters of the machine learning model or/and a number of feature vectors stored in a model database. During the inference process, the machine-learning model may be fed with the X-ray images of the inspected samples. The machine-learning model may extract one or more of the second set of features from the X-ray images and compare the extracted features to the features of a various of models. The machine learning model may classify the inspected samples into different categories based on the comparison of the second set of features to the features of the models.

In particular embodiments, the system may include an automated process utilizing computer vision techniques or/and machine-learning (ML) to process the X-ray images and identify one or more defects in the objects of interest. For example, the system may use computer vision techniques and ML models (which are trained using historical data) to identify and locate the elements of interest (e.g., solder joints) in the X-ray image of an object of interest. The system may use computer vision techniques or/and ML models to determine edges, shapes or profiles, changing gradients, dimensions or sizes, and other features or parameters in the X-ray images. The computer vision techniques and ML models may detect and identify one or more of these features based on subtle difference between the grayscale values (which may not be discernable by the human eye) taking advantage of the high resolution and large dynamic range of the X-ray images. The system may use computer vision techniques or/and machine-learning (ML) to determine one or more quality scores and identify potential defects. The system may use computer vision techniques and machine-learning (ML) to classify the defects into respective categories.

In particular embodiments, the machine-learning (ML) models may be trained by pre-labeled defective samples (e.g., parts with different types of defects) during a supervised learning process. In particular embodiments, the machine-learning (ML) models may be trained by unlabeled samples during an unsupervised learning process. For the supervised learning, the system may need enough labeled samples to appropriately train the machine-learning (ML) model. The system may, as described in earlier sections of this disclosure, determine a number of labeled samples based on the received characterization information and classification information from the second X-ray system and use the labeled samples to update the sample database for training the machine-learning (ML) model. Then, the system may train or/and re-train the machine-learning ML models using the newly labeled samples to allow the machine-learning (ML) models to better identify and classify defective samples. As a result, the machine-learning (ML) model may gradually improve the precision and accuracy for identifying and classifying defective samples. For the unsupervised learning, the machine-learning (ML) models may use one or more techniques (e.g., clustering, anomaly detections, associations, autoencoders, etc.) to automatically find useful features for identifying and classifying compliant samples and different types of defective samples.

Reducing Noise by Machine-Learning Model

In particular embodiments, the system may use the grayscale variations in the X-ray images to identify defective solder joints. In particular embodiments, the X-ray image may include a number of features (e.g., edges, shapes, shadows, etc.) that generate noise in X-ray images of the object of interest. For example, the inspected device may include a number of layers with each layer having a number of elements (e.g., solder balls, connections, strips, wires of other layers) which may overlap or intersect the elements of interest in an X-ray image which is generated from a particular direction or angle. These interfering features or elements may contribute to the noise level and reduce the signal-to-noise ratio (SNR) of the X-ray images. A reduced SNR may lead to errors in defecting defective solder joints (e.g., over rejections, false positive results, false negative results, etc.). For example, the interfering elements may attenuate the X-ray signals and result in losing dynamical range of the grayscale levels in the X-ray images for the elements of interest. As another example, the interfering elements (e.g., copper elements) may have a greater location tolerance than the elements of interest (e.g., solder joints) and may cause variations of the interfering patterns (e.g., sizes, positions, relative angles, etc.) which add additional difficulties for the system to identify the element of interest and associated defects. In particular embodiments, the system may use spectrum-specific X-ray filters or spectrum-specific X-ray sensors to generate X-ray images that are selective to different materials to reduce the interfering noise and increase signal-to-noise ratio for the inspected elements of interest.

In particular embodiments, to identify the defective elements from the X-ray images that include the interfering noise or patterns, the system may use one or more artificial intelligence algorithms (e.g., a machine-learning model, a computer vision algorithm, etc.) to process the X-ray images and identify defective elements (e.g., defective solder joints). As an example and not by way of limitation, the system may train the machine-learning model using a large number of samples (e.g., 10 K samples of the electronic devices or components). The machine-learning model may create an inspection model or reference model for the inspected samples based on the training population. Since the machine-learning model may be trained by a large sample population, the influence of the random noise in the X-ray images may be averaged out by the large sample population. The machine-learning model, after being trained, may effectively identify the defective elements of interest (e.g., defective solder joints) of the inspected sample based on the X-ray images including various types of interfering patterns (e.g., copper patterns). For example, the machine-learning model may extract a number of features or numeric attributes associated with the elements of interest in the inspected samples and identify whether there are defects associated with these elements of interest based on the extracted features.

In particular embodiments, the system may use the machine-learning model to remove or reduce the influence from these interfering features. For example, the machine-learning model may be trained by historical data (e.g., labeled data or unlabeled data) to identify a particular element of interest at a particular layer from the X-ray images containing different types of interfering features and elements. As another example, the machine-learning model may be trained to isolate the elements of interest from the interfering features or elements in X-ray images. In particular embodiments, the system may use the computer vision techniques and machine-learning models to isolate the elements of interest from the interfering features and elements based on one or more characteristics. For example, the wires or conductor strips of PCB board may have particular shapes (e.g., strip-shape with clear edges and uniform thickness), sizes, or/and dimensions. As yet another example, the solder pads may have a circular shape with particular size and may be located at particular locations (e.g., based on information accessed from a design blueprint). As a result, the machine-learning model may accurately classify the inspected components despite the noise introduced by the interfering elements.

Example Method: Two-Step Classification Process

FIG. 4 illustrates an example method 4000 for classifying inspected samples using a two-step process. The method may begin at step 410, where a computing system associated with an automated high-speed X-ray inspection system may (e.g., using a computer vision algorithm or/and a machine-learning model) to extract a first set of features from one or more regions of interest in an X-ray image. The one or more regions of interest may be associated with an element of interest of the inspected sample. At step 420, the system may (e.g., using a computer vision algorithm or/and a machine-learning model) classify the inspected sample into an inlier category or an outlier category based on the extracted first set of features and known first set of features associated with a number of inlier samples. The known first set of features associated with the inlier training samples may be associated with an inlier sample model generated by the computer vision algorithms or the machine-learning model. The inlier sample model may be generated in a feature space based on one or more features of the first set of features. The element of interest of the inspected sample may be classified into the inlier category when the element of interest meets a boundary criterion of the inlier sample model in the feature space. The inspected sample may be classified into the outlier category when the sample falls beyond the boundary criterion of the inlier sample model in the feature space.

At step 430, when the inspected sample is classified into the outlier category, the system may (e.g., using a computer vision algorithm or/and a machine-learning model) extract a second set of features from the one or more regions of interest in the X-ray images. The second set of features may be different from the first set of features (e.g., including at least one feature that is different from the first set of features or including a different combination of one or more features associated with the feature space). At step 440, the system may (e.g., using a computer vision algorithm or/and a machine-learning model) to classify the inspected sample into a sub-category of a number of sub-categories based on the extracted second set of features and known second set of features associated with different types of outlier samples. In particular embodiments, the sub-categories may include, for example, but are not limited to, a false positive category, a void defect category, a non-contact open defect category, a non-wet defect category, a head-in-pillow defect category, a bridging defect category, unknown defect category, etc. In particular embodiments, the system may determine a quality metric for the element of interest based on a distance of the element of interest to a reference point in a feature space and evaluate quality of the element of interest based on the quality metric.

In particular embodiments, the system may use a first machine-learning (ML) model, which is trained using unlabeled samples, to classify the inspected samples into inlier/outlier sample category. The first machine-learning (ML) model may classify the inspected samples based on a first set of features extracted from the X-ray images of the inspected samples. The system may use a second machine-learning (ML) model, which is trained using labeled samples of different types of defects, to classify outlier samples to respective defect categories. The second machine-learning (ML) model may classify the inspected samples based on a second set of features extracted from X-ray images of the inspected samples, which could be different from the first set of features. The first and second machine-learning (ML) model may be separately trained and re-trained without affecting the classification precision and accuracy of each other. In particular embodiments, the system may use a first computer vision algorithm to extract the first set of features and fed the extracted features into the first machine-learning (ML) model for classifying the associated samples. The system may use a second computer vision algorithm to extract the second set of features and fed the extracted features into the second machine-learning (ML) model for classifying the associated samples. In particular embodiments, the system may directly feed the X-ray images of the inspected samples to the first and second machine-learning (ML) model for extracting features and classifying the inspected samples. In particular embodiments, the system may use a single machine-learning (ML) model to classify the inspected samples into inlier/outlier sample category and respective defect categories.

Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for classifying inspected samples using a two-step process including the particular steps of the method of FIG. 4, this disclosure contemplates any suitable method for classifying inspected samples using a two-step process including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Example Method: Reference Model-Based Inspection

FIG. 5 illustrates an example method 5000 for using a reference model generated based on X-ray images of adjacent objects to inspect an object of interest. The method may begin at step 510, where a computing system associated with an automated high-speed X-ray inspection system may identify one or more reference objects for an object of interest to be inspected. Each reference object has a same type and components as the object of interest. As an example and not by way of limitation, the object of interest may be of a first object type and has one or more particular components. Each reference object may be of the first object type and has the same one or more particular components. At step 520, the system may generate a reference model for the object of interest based on one or more X-ray images of the one or more reference objects. At step 530, the system may determine whether the object of interest is associated with one or more defects by comparing a first X-ray image of the object of interest to the reference model. The one or more defects may be characterized by one or more pre-determined defect models. When the object of interest is associated with the one or more defects, the one or more defects may be classified into respective defect categories based on the one or more pre-determined defect models. In particular embodiments, the reference model and the one or more X-ray images may be associated with a first background noise pattern. In particular embodiments, the first X-ray image of the object of interest may be associated with a second background noise pattern that is substantially similar to the first background noise pattern. The substantially similar background noise profiles in the first X-ray image and the X-ray images containing the reference objects may allow the object of interest to be effectively compared to the reference model. In other words, the background noise profiles in the first X-ray image and the X-ray images containing the reference objects may be the same or may be similar enough to be within a pre-determined similarity threshold range. As a result, the small differences between them would not cause the defect detection process to incorrectly identify a defect or to fail to identify a defect based on the comparison between the object of interest and the reference object. In particular embodiments, the background noise in the first X-ray image and the X-ray image containing the reference objects may include features related to shifting of other objects nearby (e.g., objects above or below the object being tested), features that have a different dimension but within pre-determined process variation range, imaging artifacts such as distortion or noise (e.g., shot noise) in the grey levels that are within corresponding pre-determined ranges, etc. In particular embodiments, the substantially similar background noise may refer to background noise having features that are within corresponding pre-determined range of values describing conforming samples and any deviation or difference caused by background noise difference may not cause the system to identify that as a defect.

In particular embodiments, the first X-ray image of the object of interest may be captured from a first angle. The system may capture a second X-ray image of the object of interest from a second angle different from the first angle. The one or more defects may be classified into the respective defect categories based at least on the first X-ray image and the second X-ray image of the object of interest. In particular embodiments, the system may send location information associated with the one or more defects to a second X-ray inspection tool. The second X-ray inspection tool may characterize the one or more defects based on cross section X-ray images of the object of interest. The system may receive characterization information of the one or more defects from the second X-ray inspection tool. In particular embodiments, the characterization information of the one or more defects received from the second X-ray inspection tool may include defect type classification information determined by the second X-ray inspection tool.

In particular embodiments, the system may determine a number of labeled samples based on the characterization information received from the second X-ray inspection tool. The system may train one or more machine-learning models based on the plurality of labeled samples. In particular embodiments, the system may classify, using a first machine-learning model, the object of interest into an inlier category or an outlier category. The first machine-learning model may be trained based on a number of non-labeled samples during the unsupervised training process. The object of interest may be classified based on a first set of features of the object of interest and a first set of pre-determined features associated with a number of compliant samples. The object of interest may be classified into the inlier category when the object of interest meets a boundary criterion of an inlier sample model in a feature space, which characterized by one or more features of the first set of features. In particular embodiments, the object of interest may be classified into the outlier category when the object of interest falls beyond a boundary criterion of an inlier sample model in a feature space, which is characterized by one or more features of the first set of features.

In particular embodiments, when the object of interest is classified into the outlier category, the system may classify, using a second machine-learning model, the object of interest into a sub-category of a number of sub-categories based on a second set of features of the object of interest and a second set of pre-determined features associated with a number of labeled samples. The second machine-learning model may be trained by a number of labeled samples. In particular embodiments, the second set of features may be different from the first set of features. In particular embodiments, the sub-categories may include a false positive category, a void defect category, a non-contact open defect category, a non-wet defect category, a head-in-pillow defect category, a bridging defect category, or unknown defect category.

In particular embodiments, the system may determine a quality score for the object of interest based on a vector from a point in a feature space corresponding to the object of interest to a reference point in the feature space. The system may predict one or more failure modes for the object of interest based on the quality score of the object of interest and the vector. In particular embodiments, the reference model may be generated based on a weighted average of the one or more X-ray images of the one or more reference objects. In particular embodiments, the first X-ray image of the object of interest may include one or more interfering elements. The one or more reference objects may be adjacent objects to an object of interest in the same production batch.

In particular embodiments, the one or more X-ray images of the one or more reference objects may be captured with the one or more reference objects being located at a same location within a field of view of an X-ray sensor. The first X-ray image of the object of interest may be captured with the object of interest being located at the same location within the field of view of the X-ray sensor. In particular embodiments, the first X-ray image of the object of interest may be free of interfering elements or interfering objects. The one or more X-ray images of the one or more reference objects may correspond to one or more portions of the first X-ray image. The one or more reference objects may be adjacent to the object of interest within the first X-ray image. In particular embodiments, each of the one or more predetermined defect models may include one or more thresholds for characterizing an associated defect. The one or more thresholds may be determined based on one or more heuristic rules. In particular embodiments, the object of interest may be of a first object type and have one or more particular components. Each reference object may be of the first object type and have the same one or more particular components. In particular embodiments, the object of interest may be an electronic part of a production batch and the reference objects may be nearby parts to the object of interest in the same production batch. In particular embodiments, the system may eliminate, from the first X-ray image, one or more interfering elements in the first X-ray image of the object of interest based on the comparison of the first X-ray image and the reference model. The first X-ray image, with the interfering elements eliminated, may have clear X-ray image for the elements of interest in the object of interest.

Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for using a reference model generated based on X-ray images of adjacent objects to inspect an object of interest including the particular steps of the method of FIG. 5, this disclosure contemplates any suitable method for using a reference model generated based on X-ray images of adjacent objects to inspect an object of interest including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Advantages: Inspection Speed

A significant advantage of this invention is that an extended source of X-rays can be used, increasing the available flux of X-rays used for imaging. This in turn increases the throughput possible for the system. Put another way, in the time to acquire a single inspection image with a PPM system, the proposed invention can acquire over 300,000 images with the same resolution.

Consider the following comparison with the PPM X-ray system. The time to acquire an image depends on the flux $\Phi$ of X-rays:

$$T_{acquire} = (P_\# \times X_P)/\Phi$$

where $P_\#$ is the number of pixels, $X_P$ is the number of X-rays per pixel, and $\Phi$ is the X-ray flux. The X-ray flux from a point source is:

$$\text{Flux} = \Phi = \beta \times \Omega \times S_A$$

where $\beta$ is the point source brightness, $\Omega$ is the angular distribution in mrad$^2$ and $S_A$ is the point source area $S_A = \pi r^2$. The source spot size for X-ray systems is typically defined using the ASTM standard SE-1165 ["Standard Test Method for Measurement of Focal Spots of Industrial X-ray Tubes by Pinhole Imaging," ASTM Committee E-7 on Nondestructive Testing, May 15, 1992].

A typical X-ray source brightness $\beta$ is $$\beta = 10^8 \text{ X-rays/sec/mm}^2/\text{mrad}^2.$$

To avoid parallax errors in automated inspection, the PPM X-ray beam should be well collimated; a divergence of 20 mrad is typical. For a point source with $$\Omega = (20 \text{ mrad})^2 = 400 \text{ mrad}^2$$

and a source spot diameter d=2r=1 μm=10$^{-3}$ mm, the flux is given by:

$$\begin{aligned}
\text{Flux} = \Phi &= \beta \times \Omega \times S_A \\
&= 10^8 \times 400 \times \pi \times [0.5 \times 10^{-3}]^2 \text{X-rays/sec} \\
&= 400 \times \pi \times 0.25 \times 10^8 \times [10^{-3}]^2 \text{X-rays/sec} \\
&= 400 \times \pi \times 25 \text{ X-rays/sec} \\
&= 31{,}416 = 3.14 \times 10^4 \text{X-rays/sec}.
\end{aligned}$$

A typical X-ray image sensor may have 512×512 pixels that need 1,000 X-rays/pixel for image formation. An image for a PPM system will therefore be collected in approximately 8,350 seconds, or 2.3 hours.

On the other hand, keeping the same source brightness, but illuminating with a larger source spot size according to the invention dramatically increases the X-ray flux illuminating the object. As an example, assume a source with a 1 mm diameter (r=0.5 mm) separated by 100 mm from the object and, furthermore, assume that the distance from the object to scintillator is 100 microns. The angular divergence of the X-ray beam is given by:

$$\alpha = 1 \text{ mm}/100 \text{ mm} = 10 \text{ mrad},$$

making $$\Omega = 100 \text{ mrad}^2.$$

The spot area is $=\pi \times [0.5]^2 = 0.785$ mm$^2$, so the flux becomes:

$$\begin{aligned}
\text{Flux} = \Phi &= 10^8 \times 100 \times 0.785 \text{ photon/sec} \\
&= 7.85 \times 10^9 \text{ photons/sec}
\end{aligned}$$

which is higher than the PPM configuration by a factor of 250,000 times. Therefore, the same 512×512 image (with 1,000 X-rays per pixel) can now be produced at high speed and, for example, may now have a proportionally faster image collection time of approximately 33 msec.

As a practical matter, the throughput enhancement may be further reduced by a factor of between 2 and 10 from this number. A PPM imaging system can detect X-rays in the enlarged shadow image directly with a CCD X-ray detector, which can have a quantum efficiency between 50% to 100%. The typical X-ray CCD array comprises an array of pixels, with a pixel size of approximately 100 μm×100 μm.

In comparison, the high-resolution direct-shadow images for the system of the disclosed invention come from an extended X-ray source, and are not magnified. The pixels of contemporary X-ray imaging detectors are far too large to resolve the proximity images. Instead, the invention disclosed here comprises a scintillator to convert the X-rays to optical photons, and then magnifies this optical image.

In order to achieve a particular resolution, there may be thickness specifications for the scintillator. For a resolution of 1 micron, for example, the scintillator may have a specified thickness between 1 and 10 microns. For thin scintillators, some of the incident X-rays will pass through the scintillator without being absorbed. Therefore, the quantum efficiency of this conversion process may worse than the PPM system, emitting visible photons for approximately 20% of the X-rays passing through the scintillator. Beyond this, the microscope may lose additional photons, depending on the optical system NA and the quantum efficiency of the visible CCD detector. However, even with these losses, the benefit provided by the higher flux of the extended source still provides a significant advantage.

Advantages: Imaging Resolution

The resolution of the prior art PPM system is determined by the spot size of the X-ray source. For example, a source with a 1 micron spot size will produce images with 1 micron resolution, assuming the system is operating at optimal resolution. Practically speaking, it is difficult to achieve resolution much below 1 micron with a PPM system, due to rapidly decreasing efficiency of the X-ray source for small spot sizes. As the spot size of the X-ray source decreases, the X-ray power must be reduced to avoid melting the X-ray target. Furthermore, the X-ray target must be made thinner, to reduce scattering in the target. As a result, for each 2× decrease in spot size, the flux from the source decreases a factor of about 2× to 4×. Overall the throughput will decrease at least 8× for a 2× improvement in resolution.

For the imaging system according to the invention, the scintillator is in close proximity to the object being examined, and photons emitted are in proportion to the X-rays. For the optical system that relays the photons emitted by the scintillator to the detector, assuming a scintillator emission wavelength of λ=535 nm and a solid immersion optical system with NA≈1.75 comprising LuAG optical elements with refractive index n=1.84, the definition for the diffraction-limited resolution R of the optical system relaying scintillator photons to the detector is:

$$R = \frac{\lambda}{2*NA} * = \frac{535 \text{ nm}}{2*175} = 153 \text{ nm}$$

which is 6.5 times smaller than the 1 micron resolution of the PPM system.

Advantages: Time to Market

The high speed at which non-destructive images at resolutions smaller than 50 microns can be gathered can improve the time to market for the development of manufacturing processes such as the flip chip interconnect (FCI) process described earlier. The destructive processes for failure analysis, also described earlier, can take weeks to collect a single image, and months to acquire statistical data on parts. Because of the rapid time in which images can be collected and analyzed using the system of the present invention, process development time for such products can be counted in days, and is typically a fraction of the total time required to design and bring to market a new product.

Furthermore, because of the enhanced resolution, the present invention can be used for the new FCI processes with pitches smaller than 50 microns. The present invention can be used for significantly smaller pitches, and still maintain the desired image resolution and speed. In terms of the product development cycle, an increase in time for feedback of one to several weeks has a distinct and significant impact on the time required to develop a new product. In a simple case, perhaps three to five cycles of setup and data collection may be sufficient to establish a process for a new device. In a more complex case, such as a high-density interposer or a 3D IC, tens or hundreds of iterations may be required. Without the present invention, each of these cycles may take several weeks, and the total time to market of the product may come to be dominated by these cycles. Clearly a method of determining the quality of fine pitch (50 microns and smaller) bonds at the time of processing offers a significant advantage.

The images and calculations produced by the system and methods disclosed herewith allow the quality of bonds to be examined immediately after bonding in a matter of seconds or minutes. In order to develop and qualify a new semiconductor product for mass production, many individual processes and the integration of these processes must be established, tuned, and tested. In the case of forming a through-silicon via (TSV) in a semiconductor wafer, the process flow typically requires that the vias be formed first and the capture pads be subsequently formed on the wafer surface over the vias. Since the capture pads obscure optical inspection of the vias themselves, in the absence of the present invention, the alignment between the vias and the capture pads may not be accurately determined at the time of manufacturing without cutting the silicon wafer and inspecting this feature in cross-section. Since this procedure is time consuming and also destroys the silicon wafer and any economic value contained within it, it is therefore undesirable.

In the case of bonding two or more chips or substrates or even complete wafers together using FCI, the alignment, bonding force, bonding temperature, rate of heating, and rate of cooling among other factors must be tightly controlled. While control of manufacturing equipment and processes can enable some of the necessary control, inspection and measurement of features within the product that are not optically visible may also be required. Without the use of the apparatus disclosed in this invention, assembled parts must be cross-sectioned in order to be inspected. Given the fine pitch of the interconnect bonds and the very large quantity of connections, this procedure can take several weeks. Even so, typically only a very small subset of the total interconnect bonds may actually be inspected.

The inability to inspect bonds quickly can add significantly to the length of time required to fine tune both individual process steps as well as the integration of multiple process steps to create a finished product. For example, consider a case where 25 iterations of the bonding process are required to develop and qualify a product. In the case without the apparatus disclosed in this invention, each iteration may require 1 week to build each group of samples under various process and tooling configurations. After manufacturing a group of samples, an additional 2 weeks may be required to cross-section individual units and inspect the quality and attributes of the bonds that have been created. The total time is therefore: 25 cycles×(1 week making+2 weeks inspection)=75.0 weeks.

With the use of the apparatus disclosed in this invention, the 2 weeks of inspection can be reduced to a few minutes by eliminating the need for time consuming cross-sectioning. The total time for the sequential cycles may now be calculated as: 25 cycles×(1 week making+1 hour inspection) =25.15 weeks, a reduction by 49.85 weeks (or 66% of the initial time to market). With high-volume consumer electronic devices such as mobile phones selling in volumes of more than 100 million units a year, it can be easily seen that a decrease in time to market by 50 weeks (almost one year) can have significant impact on the market. The apparatus may further be integrated into the bonding tool or via filling tool, for example the electrochemical deposition tool, to provide feedback to the bonding process in real time. The use of the apparatus in this way reduces time to market by many weeks and may in fact enable a product to enter the market that otherwise would be too costly or too late to market to have economic value.

Advantages: Product Yield and Cost

It has been reported that commercial production began on these devices with overall yields related to package assembly and interconnect in the range of 80%. This yield is far lower than typically accepted in the semiconductor field, and there is considerable additional cost associated with the scrap material. However, this particular part was determined to have such high commercial value that, even considering the cost associated with low yield, it was commercially feasible to produce with only 80% package assembly yield. In other lower-cost, more consumer-oriented segments of the market, pressure on pricing is much more intense, and it is unlikely that a product with package assembly yields at this level could be commercially viable. For this reason, it is necessary for the manufacturing process to be highly capable and tightly controlled, such that the amount of scrap product or yield loss resulting from the bonding process is reduced. Traditionally, package assembly yields are in the 98 to 99% range. Those skilled in the art will quickly realize that scrapping good chips by using poorly yielding bonding techniques, and packaging yields of 80% for lower value chips, are simply not acceptable.

It should be noted that, in the case of multiple dice mounted together either as a 3D IC or onto a high-density interposer, the failure of one connection on any chip will result in the scrapping of the entire MCP or package assembly. There may be thousands or tens of thousands of connections that must all function as designed. It is rare that any kind of rework or recovery of materials can be accomplished if any of the bonds are not produced correctly. For example, take the case when a processor chip with a cost of $10 is mounted together with four memory chips costing $5 each, or $20. The total cost of the chips is therefore $30. Chip assembly and packaging may add another $5 of cost for a total assembly cost of $35.

By using the images and measurements produced by the apparatus in this disclosure, the processes of aligning, inspection bonding can be controlled and monitored such that the yield can be rapidly increased. For MCP packages, in the example above, detecting a flaw between the first two dice will allow the packaging assembler to scrap the first two die only, and not require the loss of all five dice, therefore saving scrap costs and improving yield. It is common for well-controlled and monitored assembly processes to have yields of over 99.9%. The present invention allows a packaging assembler to achieve a yield of greater than or equal to 90% in MCP structures having more than 4 dice and having more than 100 TSVs per interposer or die layer at pitches where the smallest pitch is less than 100 microns. The same yield advantage may be achieved in the flip chip configuration having more than 400 microbumps at a pitch where the smallest pitch is less than 100 microns.

This same advantage in cost and yield can be seen at other steps in the manufacturing process for fine-pitch interposers and 3D die stacking, such as via fill monitor for voids, via capture pad alignment to via, alignment of chip-bump to chip or interposer pad, and quality of completed joint after bonding. It may also be used to measure bondline in the assembly of multiple slices of silicon devices or fine pitch interposers or between silicon devices and other materials of interest where this bondline thickness is critical to device performance.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an automated high-speed X-ray inspection system:
   identifying one or more reference objects for an object of interest to be inspected, wherein each reference object has a same type and components as the object of interest;

generating a reference model for the object of interest based on one or more X-ray images of the one or more reference objects; and determining whether the object of interest is associated with one or more defects by comparing a first X-ray image of the object of interest to the reference model, wherein the one or more defects are characterized by one or more pre-determined defect models, and wherein, when the object of interest is associated with the one or more defects, the one or more defects are classified into respective defect categories based on the one or more pre-determined defect models, wherein the reference model is generated based on a weighted average of two or more X-ray images of the one or more reference objects, the weighted average providing a pixel by pixel average of variations specific to the X-ray images based on a standard object of interest.

2. The method of claim 1, wherein the reference model and the one or more X-ray images are associated with a first background noise pattern, and wherein the first X-ray image of the object of interest is associated with a second background noise pattern that is substantially similar to the first background noise pattern.

3. The method of claim 1, wherein the first X-ray image of the object of interest is captured from a first angle, further comprising:

capturing a second X-ray image of the object of interest from a second angle different from the first angle, wherein the one or more defects are classified into the respective defect categories based at least on the first X-ray image and the second X-ray image of the object of interest.

4. The method of claim 1, further comprising:

sending location information associated with the one or more defects to a second X-ray inspection tool, wherein the second X-ray inspection tool characterizes the one or more defects based on cross section X-ray images of the object of interest; and receiving characterization information of the one or more defects from the second X-ray inspection tool.

5. The method of claim 4, wherein the characterization information of the one or more defects received from the second X-ray inspection tool comprises defect type classification information determined by the second X-ray inspection tool.

6. The method of claim 4, further comprising:

determining a plurality of labeled samples based on the characterization information received from the second X-ray inspection tool; and training one or more machine-learning models based on the plurality of labeled samples.

7. The method of claim 1, further comprising:

classifying, using a first machine-learning model, the object of interest into an inlier category or an outlier category, wherein the first machine-learning model is trained based on a plurality of non-labeled samples during an unsupervised training process, and wherein the object of interest is classified based on a first set of features of the object of interest and a first set of pre-determined features associated with a plurality of compliant samples.

8. The method of claim 7, wherein the object of interest is classified into the inlier category when the object of interest meets a boundary criterion of an inlier sample model in a feature space, and wherein the feature space is characterized by one or more features of the first set of features.

9. The method of claim 7, wherein the object of interest is classified into the outlier category when the object of interest falls beyond a boundary criterion of an inlier sample model in a feature space, and wherein the feature space is characterized by one or more features of the first set of features.

10. The method of claim 7, further comprising:

when the object of interest is classified into the outlier category, classifying, by a second machine-learning model, the object of interest into a sub-category of a plurality of sub-categories based on a second set of features of the object of interest and a second set of pre-determined features associated with a plurality of labeled samples, wherein the second machine-learning model is trained by the plurality of labeled samples, and wherein the second set of features are different from the first set of features.

11. The method of claim 10, wherein the plurality of sub-categories comprise a false positive category, a void defect category, a non-contact open defect category, a non-wet defect category, a head-in-pillow defect category, a bridging defect category, or an unknown defect category.

12. The method of claim 10, further comprising:

determining a quality score for the object of interest based on a vector from a point in a feature space corresponding to the object of interest to a reference point in the feature space; and predicting one or more failure modes for the object of interest based on the quality score of the object of interest and the vector.

13. The method of claim 1, wherein the first X-ray image of the object of interest comprises one or more interfering elements, and wherein the one or more reference objects are preceding objects of an object of interest in a same product batch.

14. The method of claim 1, wherein the one or more X-ray images of the one or more reference objects are captured with the one or more reference objects being located at a same location within a field of view of an X-ray sensor, and wherein the first X-ray image of the object of interest is captured with the object of interest being located at the same location within the field of view of the X-ray sensor.

15. The method of claim 1, wherein the first X-ray image of the object of interest is free of interfering elements, wherein the one or more X-ray images of the one or more reference objects correspond to one or more portions of the first X-ray image, and wherein the one or more reference objects are adjacent to the object of interest within the first X-ray image.

16. The method of claim 1, wherein each of the one or more pre-determined defect models comprises one or more thresholds for characterizing an associated defect, and wherein the one or more thresholds are determined based on one or more heuristic rules.

17. The method of claim 1, wherein the object of interest is of a first object type and has one or more particular components, and wherein each reference object is of the first object type and has the same one or more particular components.

18. The method of claim 1, further comprising:

eliminating, from the first X-ray image, one or more interfering elements in the first X-ray image of the object of interest based on the comparison of the first X-ray image and the reference model.

19. The method of claim 1, wherein the weighted average is weighted based on a quality score associated with each of the two or more X-ray images, the quality score being based on one of a proximity of the object of interest to the one or more reference objects, an image quality and a part quality score for each reference object.

20. One or more computer-readable non-transitory storage media embodying software that is operable when executed to:

identify one or more reference objects for an object of interest to be inspected, wherein each reference object has a same type and components as the object of interest;

generate a reference model for the object of interest based on one or more X-ray images of the one or more reference objects; and determine whether the object of interest is associated with one or more defects by comparing a first X-ray image of the object of interest to the reference model, wherein the one or more defects are characterized by one or more pre-determined defect models, and wherein, when the object of interest is associated with the one or more defects, the one or more defects are classified into respective defect categories based on the one or more pre-determined defect models, wherein the reference model is generated based on a weighted average of two or more X-ray images of the one or more reference objects, the weighted average providing a pixel by pixel average of variations specific to the X-ray images based on a standard object of interest.

21. A system comprising: one or more processors; and one or more computer-readable non-transitory storage media coupled to one or more of the processors and comprising instructions operable when executed by one or more of the processors to cause the system to:

identify one or more reference objects for an object of interest to be inspected, wherein each reference object has a same type and components as the object of interest;

generate a reference model for the object of interest based on one or more X-ray images of the one or more reference objects; and determine whether the object of interest is associated with one or more defects by comparing a first X-ray image of the object of interest to the reference model, wherein the one or more defects are characterized by one or more pre-determined defect models, and wherein, when the object of interest is associated with the one or more defects, the one or more defects are classified into respective defect categories based on the one or more pre-determined defect models, wherein the reference model is generated based on a weighted average of two or more X-ray images of the one or more reference objects, the weighted average providing a pixel by pixel average of variations specific to the X-ray images based on a standard object of interest.

* * * * *